US010951273B2

(12) United States Patent
Zhou et al.

(10) Patent No.: US 10,951,273 B2
(45) Date of Patent: Mar. 16, 2021

(54) ELECTRONIC DEVICE, METHOD AND STORAGE MEDIUM FOR WIRELESS COMMUNICATION SYSTEM

(71) Applicant: Sony Corporation, Tokyo (JP)

(72) Inventors: Zhengyi Zhou, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/640,732

(22) PCT Filed: Nov. 20, 2018

(86) PCT No.: PCT/CN2018/116305
§ 371 (c)(1),
(2) Date: Feb. 21, 2020

(87) PCT Pub. No.: WO2019/101051
PCT Pub. Date: May 31, 2019

(65) Prior Publication Data
US 2020/0186205 A1 Jun. 11, 2020

(30) Foreign Application Priority Data

Nov. 21, 2017 (CN) .......................... 201711169863.1

(51) Int. Cl.
*H04B 7/02* (2018.01)
*H04B 7/0408* (2017.01)
(Continued)

(52) U.S. Cl.
CPC ......... *H04B 7/0408* (2013.01); *H04B 7/0695* (2013.01); *H04B 7/088* (2013.01); *H04B 17/309* (2015.01)

(58) Field of Classification Search
CPC .. H04B 7/0408; H04B 17/309; H04B 7/0695; H04B 7/088; H04B 7/06; H04B 7/08
See application file for complete search history.

(56) References Cited

U.S. PATENT DOCUMENTS

2013/0039345 A1* 2/2013 Kim ................... H04W 72/042
370/332
2015/0382289 A1 12/2015 Rydnell et al.
(Continued)

FOREIGN PATENT DOCUMENTS

WO 2017/007177 A1 1/2017
WO 2017/157450 A1 9/2017

OTHER PUBLICATIONS

International Search Report and Written Opinion dated Feb. 20, 2019 for PCT/CN2018/116305 filed on Nov. 20, 2018, 10 pages including English Translation of the International Search Report.
(Continued)

*Primary Examiner* — Dhaval V Patel
(74) *Attorney, Agent, or Firm* — Xsensus, LLP

(57) ABSTRACT

The present disclosure relates to an electronic device, a method, and a storage medium for a wireless communication system. Various embodiments regarding beam pair selection are described. In one embodiment, an electronic device for a wireless communication system can comprise a processing circuitry configured to determine K beam pairs in a communication link between a first communication apparatus and a second communication apparatus for a wireless communication system, where K is a natural number, and each beam pair comprises a transmitting beam and a receiving beam; and calculate a beam gain gradient for each beam pair, wherein the beam gain gradient indicates a spatial gain variation of a respective beam pair.

9 Claims, 29 Drawing Sheets

(51) Int. Cl.
    *H04B 17/309*    (2015.01)
    *H04B 7/06*    (2006.01)
    *H04B 7/08*    (2006.01)

(56) References Cited

U.S. PATENT DOCUMENTS

2016/0165458 A1\* 6/2016 Peng .................... H04B 7/0413
                                                              370/329
2016/0329636 A1   11/2016 Larsson et al.
2017/0078001 A1    3/2017 Kim et al.
2017/0134079 A1    5/2017 Kim et al.
2018/0205421 A1\*  7/2018 Park .......................... G01S 5/02

OTHER PUBLICATIONS

Extended European search report dated Nov. 4, 2020, in corresponding European patent Application No. 18880988.3, 12 pages.

\* cited by examiner

|    | T1  | T2  | T3  | T4  | T5   | T6   | T7  | T8  | T9  | T10 | T11 | T12  | T13  | T14  | T15 | T16 |
|----|-----|-----|-----|-----|------|------|-----|-----|-----|-----|-----|------|------|------|-----|-----|
| R1 | 1.5 | 1.6 | 1.7 | 2.0 | 3.2  | 1.2  | 1.0 | 1.7 | 2.1 | 3.8 | 7.3 | 10.1 | 11.0 | 6.0  | 2.3 | 1.3 |
| R2 | 1.1 | 1.2 | 1.3 | 1.8 | 3.7  | 3.4  | 0.5 | 0.3 | 0.7 | 1.3 | 2.8 | 15.3 | 8.2  | 3.7  | 0.9 | 1.0 |
| R3 | 1.3 | 1.7 | 2.6 | 4.5 | 13.2 | 19.6 | 6.5 | 4.4 | 3.7 | 3.7 | 4.9 | 16.8 | 6.1  | 4.9  | 1.2 | 0.9 |
| R4 | 1.6 | 1.4 | 1.2 | 0.9 | 0.6  | 5.0  | 3.0 | 3.9 | 3.1 | 4.6 | 8.0 | 16.4 | 17.4 | 11.2 | 1.8 | 1.8 |

FIG. 5A

|    | T1  | T2  | T3  | T4  | T5   | T6   | T7  | T8  | T9  | T10 | T11 | T12  | T13 | T14 | T15 | T16 |
|----|-----|-----|-----|-----|------|------|-----|-----|-----|-----|-----|------|-----|-----|-----|-----|
| R1 | 1.3 | 1.7 | 2.6 | 4.5 | 13.2 | 19.6 | 6.5 | 4.4 | 3.7 | 3.7 | 4.9 | 16.8 | 6.1 | 4.9 | 1.2 | 0.9 |

FIG. 5B

Table 1

|    | x1  | x2  | x3  | x4  | x5  |
|----|-----|-----|-----|-----|-----|
| y1 | 1.5 | 1.6 | 1.7 | 2.0 | 1.1 |
| y2 | 1.1 | 1.2 | 1.3 | 1.8 | 1.6 |
| y3 | 1.3 | 1.7 | 2.6 | 4.5 | 1.2 |
| y4 | 1.6 | 1.4 | 1.2 | 0.9 | 1.5 |
| y5 | 1.3 | 1.1 | 1.7 | 1.1 | 1.3 |

Table 2

|    | x1   | x2   | x3   | x4  | x5  |
|----|------|------|------|-----|-----|
| y1 | 3.2  | 1.2  | 1.0  | 1.7 | 3.7 |
| y2 | 3.7  | 3.4  | 0.5  | 0.3 | 0.6 |
| y3 | 13.2 | 19.6 | 6.5  | 4.4 | 3.4 |
| y4 | 0.6  | 5.0  | 3.0  | 3.0 | 3.2 |
| y5 | 13.2 | 3.7  | 19.6 | 3.7 | 0.5 |

Table 3

|    | x1  | x2  | x3  | x4   | x5  |
|----|-----|-----|-----|------|-----|
| y1 | 2.4 | 3.8 | 7.3 | 10.1 | 0.7 |
| y2 | 0.7 | 1.3 | 2.8 | 15.3 | 3.4 |
| y3 | 3.7 | 3.7 | 4.9 | 16.8 | 1.3 |
| y4 | 3.4 | 4.6 | 8.0 | 16.4 | 2.4 |
| y5 | 3.7 | 0.7 | 3.7 | 0.7  | 2.8 |

Table 4

|    | x1   | x2   | x3  | x4  | x5   |
|----|------|------|-----|-----|------|
| y1 | 11.0 | 6.0  | 2.3 | 1.3 | 8.2  |
| y2 | 8.2  | 3.7  | 0.9 | 1.0 | 17.4 |
| y3 | 6.1  | 4.9  | 1.2 | 0.9 | 3.7  |
| y4 | 17.4 | 11.2 | 1.8 | 1.8 | 11.0 |
| y5 | 6.1  | 8.2  | 4.9 | 8.2 | 0.9  |

FIG. 5D

|     | T1  | T2  | T3  | T4  | T5   | T6   | T7  | T8  | T9  | T10 | T11 | T12  | T13  | T14  | T15 | T16 |
| --- | --- | --- | --- | --- | ---- | ---- | --- | --- | --- | --- | --- | ---- | ---- | ---- | --- | --- |
| R1  | 1.5 | 1.6 | 1.7 | 2.0 | 3.2  | 1.2  | 1.0 | 1.7 | 2.4 | 3.8 | 7.3 | 10.1 | 11.0 | 6.0  | 2.3 | 1.3 |
| R2  | 1.1 | 1.2 | 1.3 | 1.8 | 3.7  | 3.4  | 0.5 | 0.3 | 0.7 | 1.3 | 2.8 | 15.3 | 8.2  | 3.7  | 0.9 | 1.0 |
| R3  | 1.3 | 1.7 | 2.6 | 4.5 | 13.2 | 19.6 | 6.5 | 4.4 | 3.7 | 3.7 | 4.9 | 16.8 | 6.1  | 4.9  | 1.2 | 0.9 |
| R4  | 1.6 | 1.4 | 1.2 | 0.9 | 0.6  | 5.0  | 3.0 | 2.0 | 3.4 | 4.6 | 8.0 | 16.4 | 17.4 | 11.2 | 1.8 | 1.8 |

|     | T1  | T2  | T3  | T4  | T5  | T6   | T7  | T8  | T9  | T10 | T11 | T12 | T13  | T14 | T15 | T16 |
| --- | --- | --- | --- | --- | --- | ---- | --- | --- | --- | --- | --- | --- | ---- | --- | --- | --- |
| R1  |     |     |     |     |     |      |     |     |     |     |     |     |      |     |     |     |
| R2  |     |     |     |     |     |      |     |     |     |     |     |     |      |     |     |     |
| R3  |     |     |     |     |     | 0.50 |     |     |     |     |     |     | 0.21 |     |     |     |
| R4  |     |     |     |     |     |      |     |     |     |     |     |     |      |     |     |     |

FIG. 7A

|     | T1  | T2  | T3  | T4  | T5   | T6   | T7  | T8  | T9  | T10 | T11 | T12  | T13  | T14  | T15 | T16 |
| --- | --- | --- | --- | --- | ---- | ---- | --- | --- | --- | --- | --- | ---- | ---- | ---- | --- | --- |
| R1  | 1.5 | 1.6 | 1.7 | 2.0 | 3.2  | 1.2  | 1.0 | 1.7 | 2.4 | 3.8 | 7.3 | 10.1 | 11.0 | 6.0  | 2.3 | 1.3 |
| R2  | 1.1 | 1.2 | 1.3 | 1.8 | 3.7  | 3.4  | 0.5 | 0.3 | 0.7 | 1.3 | 2.8 | 15.3 | 8.2  | 3.7  | 0.9 | 1.0 |
| R3  | 1.3 | 1.7 | 2.6 | 4.5 | 13.2 | 19.6 | 6.5 | 4.4 | 2.7 | 3.7 | 4.9 | 16.8 | 6.1  | 4.9  | 1.2 | 0.9 |
| R4  | 1.6 | 1.4 | 1.2 | 0.9 | 0.6  | 5.0  | 3.0 | 3.0 | 3.4 | 4.6 | 8.0 | 16.4 | 17.4 | 11.2 | 1.8 | 1.8 |

|     | T1  | T2  | T3  | T4  | T5  | T6   | T7  | T8  | T9  | T10 | T11 | T12 | T13  | T14 | T15 | T16 |
| --- | --- | --- | --- | --- | --- | ---- | --- | --- | --- | --- | --- | --- | ---- | --- | --- | --- |
| R1  |     |     |     |     |     |      |     |     |     |     |     |     |      |     |     |     |
| R2  |     |     |     |     |     |      |     |     |     |     |     |     |      |     |     |     |
| R3  |     |     |     |     |     | 0.79 |     |     |     |     |     |     |      |     |     |     |
| R4  |     |     |     |     |     |      |     |     |     |     |     |     | 0.65 |     |     |     |

FIG. 7B

|    | T1  | T2  | T3  | T4  | T5   | T6   | T7  | T8  | T9  | T10 | T11  | T12  | T13  | T14  | T15 | T16 |
|----|-----|-----|-----|-----|------|------|-----|-----|-----|-----|------|------|------|------|-----|-----|
| R1 | 1.5 | 1.6 | 1.7 | 2.0 | 3.2  | 1.2  | 1.0 | 1.7 | 2.1 | 3.8 | 7.3  | 10.1 | 11.0 | 6.0  | 2.3 | 1.3 |
| R2 | 1.1 | 1.2 | 1.8 | 1.8 | 3.7  | 3.4  | 0.5 | 0.3 | 0.7 | 1.3 | 2.8  | 15.3 | 8.2  | 3.7  | 0.9 | 1.0 |
| R3 | 1.3 | 1.7 | 2.6 | 4.5 | 13.2 | 19.6 | 6.5 | 4.4 | 3.7 | 3.7 | 4.9  | 16.8 | 6.1  | 4.9  | 1.2 | 0.9 |
| R4 | 1.6 | 1.1 | 1.2 | 0.9 | 0.6  | 5.0  | 3.0 | 3.0 | 3.4 | 4.6 | 8.0  | 16.4 | 17.4 | 11.2 | 1.8 | 1.8 |

|    | T1 | T2 | T3 | T4 | T5 | T6   | T7 | T8 | T9 | T10 | T11 | T12 | T13  | T14 | T15 | T16 |
|----|----|----|----|----|----|------|----|----|----|-----|-----|-----|------|-----|-----|-----|
| R1 |    |    |    |    |    |      |    |    |    |     |     |     |      |     |     |     |
| R2 |    |    |    |    |    |      |    |    |    |     |     |     |      |     |     |     |
| R3 |    |    |    |    |    | 1.94 |    |    |    |     |     |     |      |     |     |     |
| R4 |    |    |    |    |    |      |    |    |    |     |     |     | 0.28 |     |     |     |

FIG. 7C

|    | T1  | T2  | T3  | T4  | T5   | T6   | T7  | T8  | T9  | T10 | T11 | T12  | T13 | T14 | T15 | T16 |
|----|-----|-----|-----|-----|------|------|-----|-----|-----|-----|-----|------|-----|-----|-----|-----|
| R1 | 1.3 | 1.7 | 2.6 | 4.5 | 13.2 | 19.6 | 6.5 | 4.4 | 3.7 | 3.7 | 4.9 | 16.8 | 6.1 | 4.9 | 1.2 | 0.9 |

|    | T1 | T2 | T3 | T4 | T5 | T6   | T7 | T8 | T9 | T10 | T11 | T12  | T13 | T14 | T15 | T16 |
|----|----|----|----|----|----|------|----|----|----|-----|-----|------|-----|-----|-----|-----|
| R1 |    |    |    |    |    | 0.50 |    |    |    |     |     | 0.67 |     |     |     |     |

FIG. 7D

|    | x1   | x2  | x3  | x4  | x5  |
|----|------|-----|-----|-----|-----|
| y1 | 1.5  | 1.6 | 1.7 | 2.0 | 1.1 |
| y2 | 1.1  | 1.2 | 1.3 | 1.8 | 1.6 |
| y3 | 1.3  | 1.7 | 2.6 | 4.5 | 1.2 |
| y4 | 1.6  | 1.4 | 1.2 | 0.9 | 1.5 |
| y5 | 1.3  | 1.1 | 1.7 | 1.1 | 1.3 |

|    | x1   | x2   | x3   | x4  | x5  |
|----|------|------|------|-----|-----|
| y1 | 3.2  | 1.2  | 1.0  | 1.7 | 3.7 |
| y2 | 3.7  | 3.4  | 0.5  | 0.3 | 0.6 |
| y3 | 13.2 | 19.6 | 6.5  | 4.4 | 3.4 |
| y4 | 0.6  | 5.0  | 3.0  | 3.0 | 3.2 |
| y5 | 13.2 | 3.7  | 19.6 | 3.7 | 0.5 |

|    | x1  | x2  | x3  | x4   | x5  |
|----|-----|-----|-----|------|-----|
| y1 | 2.4 | 3.8 | 7.3 | 10.1 | 0.7 |
| y2 | 0.7 | 1.3 | 2.8 | 15.3 | 3.4 |
| y3 | 3.7 | 3.7 | 4.9 | 16.8 | 1.3 |
| y4 | 3.4 | 4.6 | 8.0 | 16.4 | 2.4 |
| y5 | 3.7 | 0.7 | 3.7 | 0.7  | 2.8 |

|    | x1   | x2   | x3  | x4  | x5   |
|----|------|------|-----|-----|------|
| y1 | 11.0 | 6.0  | 2.3 | 1.3 | 8.2  |
| y2 | 8.2  | 3.7  | 0.9 | 1.0 | 17.4 |
| y3 | 6.1  | 4.9  | 1.2 | 0.9 | 3.7  |
| y4 | 17.4 | 11.2 | 1.8 | 1.8 | 11.0 |
| y5 | 6.1  | 8.2  | 4.9 | 8.2 | 0.9  |

FIG. 8A

|    | x1   | x2   | x3  | x4   | x5  |
|----|------|------|-----|------|-----|
| y1 | 1.5  | 1.6  | 1.7 | 2.0  | 1.1 |
| y2 | 1.1  | 1.2  | 1.3 | 1.8  | 1.6 |
| y3 | 1.3  | 1.7  | 2.6 | 4.5  | 1.2 |
| y4 | 1.6  | 1.4  | 1.2 | 0.9  | 1.5 |
| y5 | 1.3  | 1.1  | 1.7 | 1.1  | 1.3 |

|    | x1   | x2   | x3   | x4  | x5  |
|----|------|------|------|-----|-----|
| y1 | 3.2  | 1.2  | 1.0  | 1.7 | 3.7 |
| y2 | 3.7  | 3.4  | 0.5 | 0.3 | 0.6 |
| y3 | 13.2 | 19.6 | 6.5 | 4.4 | 3.4 |
| y4 | 0.6  | 5.0  | 3.0 | 3.0 | 3.2 |
| y5 | 13.2 | 3.7  | 19.6 | 3.7 | 0.5 |

|    | x1  | x2  | x3  | x4   | x5  |
|----|-----|-----|-----|------|-----|
| y1 | 2.4 | 3.8 | 7.3 | 10.1 | 0.7 |
| y2 | 0.7 | 1.3 | 2.8 | 15.3 | 3.4 |
| y3 | 3.7 | 3.7 | 4.9 | 16.8 | 1.3 |
| y4 | 3.4 | 4.6 | 8.0 | 16.4 | 2.4 |
| y5 | 3.7 | 0.7 | 3.7 | 0.7  | 2.8 |

|    | x1   | x2   | x3  | x4  | x5   |
|----|------|------|-----|-----|------|
| y1 | 11.0 | 6.0  | 2.3 | 1.3 | 8.2  |
| y2 | 8.2  | 3.7  | 0.9 | 1.0 | 17.4 |
| y3 | 6.1  | 4.9  | 1.2 | 0.9 | 3.7  |
| y4 | 17.4 | 11.2 | 1.8 | 1.8 | 11.0 |
| y5 | 6.1  | 8.2  | 4.9 | 8.2 | 0.9  |

FIG. 8B

|    | x1   | x2   | x3   | x4   | x5   |
|----|------|------|------|------|------|
| y1 | 1.5  | 1.6  | 1.7  | 2.0  | 1.1  |
| y2 | 1.1  | 1.2  | 1.3  | 1.8  | 1.6  |
| y3 | 1.3  | 1.7  | 2.6  | 4.5  | 1.2  |
| y4 | 1.6  | 1.4  | 1.2  | 0.9  | 1.5  |
| y5 | 1.3  | 1.1  | 1.7  | 1.1  | 1.3  |

|    | x1   | x2   | x3   | x4   | x5   |
|----|------|------|------|------|------|
| y1 | 3.2  | 1.2  | 1.0  | 1.7  | 3.7  |
| y2 | 3.7  | 3.4  | 0.5  | 0.3  | 0.6  |
| y3 | 13.2 | 19.6 | 6.5  | 4.4  | 3.4  |
| y4 | 0.6  | 5.0  | 3.0  | 3.0  | 3.2  |
| y5 | 13.2 | 3.7  | 19.6 | 3.7  | 0.5  |

|    | x1   | x2   | x3   | x4   | x5   |
|----|------|------|------|------|------|
| y1 | 2.4  | 3.8  | 7.3  | 10.1 | 0.7  |
| y2 | 0.7  | 1.3  | 2.8  | 15.3 | 3.4  |
| y3 | 3.7  | 3.7  | 4.9  | 16.8 | 1.3  |
| y4 | 3.4  | 4.6  | 8.0  | 16.4 | 2.4  |
| y5 | 3.7  | 0.7  | 3.7  | 0.7  | 2.8  |

|    | x1   | x2   | x3   | x4   | x5   |
|----|------|------|------|------|------|
| y1 | 11.0 | 6.0  | 2.3  | 1.3  | 8.2  |
| y2 | 8.2  | 3.7  | 0.9  | 1.0  | 17.4 |
| y3 | 6.1  | 4.9  | 1.2  | 0.9  | 3.7  |
| y4 | 17.4 | 11.2 | 1.8  | 1.8  | 11.0 |
| y5 | 6.1  | 8.2  | 4.9  | 8.2  | 0.9  |

┌─────────────────────────────────────────┐
│ Determining beam gains of k beam pairs in a downlink │ 1241
│ between a base station and a terminal device │
└─────────────────────────────────────────┘
                    ↓
┌─────────────────────────────────────────┐
│ Calculating a beam gain gradient for each beam pair │ 1243
└─────────────────────────────────────────┘
                    ↓
┌─────────────────────────────────────────┐
│ Transmitting identification information related to │
│ the k beam pairs, corresponding beam gains, │ 1245
│ and beam gain gradients to the base station │
└─────────────────────────────────────────┘
                    ↓
┌─────────────────────────────────────────┐
│ Receiving identification information for a selected │ 1247
│ downlink beam pair from the base station │
└─────────────────────────────────────────┘

FIG. 12B

ELECTRONIC DEVICE, METHOD AND STORAGE MEDIUM FOR WIRELESS COMMUNICATION SYSTEM

CROSS-REFERENCE TO RELATED APPLICATIONS

The present application is based on PCT filing PCT/CN2018/116305, filed Nov. 20, 2018, which claims priority to CN 201711169863.1, filed Nov. 21, 2017, the entire contents of each are incorporated herein by reference.

TECHNICAL FIELD

The present disclosure relates generally to wireless communication system, and in particular, to techniques for beam training and beam selection.

BACKGROUND ART

In recent years, with the development and wide application of mobile internet technology, wireless communication has unprecedentedly met people's needs for voice and data communication. In order to provide even higher communication quality and capacity, wireless communication system employs various technologies at different layers, such as multi-beam technology and/or referred to as Beamforming techniques. Beamforming can provide beamforming gain to compensate for loss of radio signals by increasing the directivity of antenna transmission and/or reception. In future wireless communication systems (such as 5G systems like NR (New Radio) system, for example), the number of antenna ports at the base station and the terminal device sides will further increase. For example, the number of antenna ports at the base station side may increase to hundreds or even more, constituting a Massive MIMO system. Thus, in large-scale antenna systems, beamforming will have a larger application space.

In a multi-beam communication system, due to the increased directivity of antenna transmission and/or reception, a stable communication link is established by relying on adaptive alignment of transmitting and receiving beams. In the case where the transmitting and receiving beams are not adaptively aligned, use of beamforming not only cannot obtain beamforming gains, but even reduce the performance of communication, resulting in the reception signal-to-noise ratio fail to meet requirements of effective and reliable communication. In general, adaptively aligned transmitting and receiving beams can be selected via beam training process to establish a communication beam pair.

SUMMARY OF THE INVENTION

One aspect of the present disclosure relates to an electronic device for a wireless communication system. According to one embodiment, the electronic device can comprise a processing circuitry. The processing circuitry can be configured to determine K beam pairs in a communication link between a first communication apparatus and a second communication apparatus for the wireless communication system, where K is a natural number, and each beam pair comprises a transmitting beam and a receiving beam; and calculate a beam gain gradient for each beam pair, wherein the beam gain gradient indicates a spatial gain variation of a respective beam pair.

One aspect of the present disclosure relates to a terminal device for a wireless communication system. According to one embodiment, the terminal device comprises a processing circuitry. The processing circuitry can be configured to determine beam gains of K beam pairs in downlink between a base station and the terminal device, where K is a natural number; calculate a beam gain gradient for each beam pair; transmit identification information related to the K beam pairs, the corresponding beam gain and the beam gain gradient to the base station; and receive identification information of a selected downlink beam pair from the base station. Wherein each beam pair comprises a transmitting beam and a receiving beam, and the beam gain gradient indicates a spatial gain variation of a respective beam pair.

One aspect of the present disclosure relates to a base station for a wireless communication system. According to one embodiment, the base station comprises a processing circuitry. The processing circuitry can be configured to receive identification information related to K downlink beam pairs, corresponding beam gains and beam gain gradients from a terminal device, where K is a natural number; select a downlink beam pair for communication from the K beam pairs based on the beam gains and the beam gain gradients; and transmit the identification information of the selected downlink beam pair to the terminal device. Wherein each beam pair comprises a transmitting beam and a receiving beam, and the beam gain gradient indicates a spatial gain variation of a respective beam pair.

Another aspect of the present disclosure relates to a wireless communication method. In one embodiment, the method can comprise determining K beam pairs in a communication link between a first communication apparatus and a second communication apparatus for a wireless communication system, where K is a natural number, and each beam pair comprises a transmitting beam and a receiving beam; and calculating a beam gain gradient for each beam pair, wherein the beam gain gradient indicates a spatial gain variation of a respective beam pair.

Another aspect of the present disclosure relates to a method for wireless communication. In one embodiment, the method can comprise determining beam gains of K beam pairs in downlink between a base station and a terminal device, wherein K is a natural number; calculating a beam gain gradient for each beam pair; transmitting identification information related to the K beam pairs, corresponding beam gains and beam gain gradients to the base station; and receiving identification information of a selected downlink beam pair from the base station. Wherein each beam pair comprises a transmitting beam and a receiving beam, and the beam gain gradient indicates a spatial gain variation of a respective beam pair.

Another aspect of the present disclosure relates to a method for wireless communication. In one embodiment, the method can comprise receiving identification information related to K downlink beam pairs, corresponding beam gains and beam gain gradients from a terminal device, where K is a natural number; selecting a downlink beam pair for communication from the K beam pairs based on the beam gains and the beam gain gradients; and transmitting the identification information of the selected downlink beam pair to the terminal device. Wherein each beam pair comprises a transmitting beam and a receiving beam, and the beam gain gradient indicates a spatial gain variation of a respective beam pair.

Yet another aspect of the present disclosure relates to a computer-readable storage medium storing one or more instructions. In some embodiments, the one or more instructions can, when executed by one or more processors of an electronic device, cause the electronic device to perform the methods according to various embodiments of the present disclosure.

Yet another aspect of the present disclosure relates to various apparatus including means or units for performing operations of methods according to embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments herein and explaining the theory and advantages of the present disclosure. Wherein:

FIGS. 5A to 5D illustrate examples of beam pair determination according to an embodiment of the present disclosure.

FIGS. 7A to 7D illustrate examples of calculating a beam gain gradient according to an embodiment of the present disclosure.

FIGS. 8A to 8C illustrate examples of calculating a beam gain gradient according to an embodiment of the present disclosure.

FIGS. 12A to 12C illustrate example methods for communication according to an embodiment of the present disclosure.

Figure 1A:
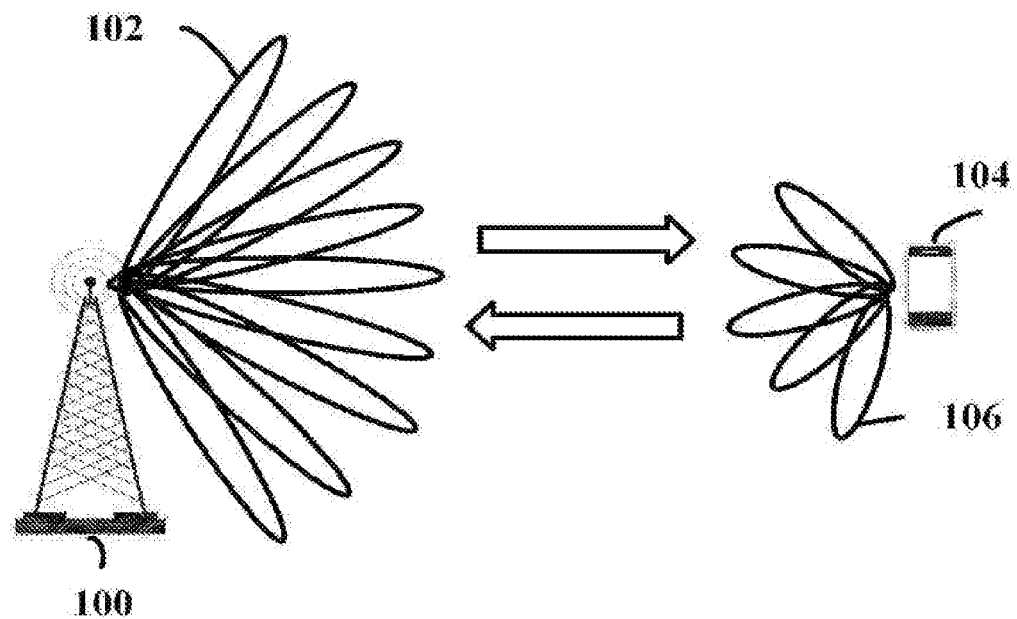
FIGS. 1A and 1B depict an exemplary beam sweeping process in a wireless communication system.

While the embodiments herein are susceptible to various modifications and alternative forms, the specific embodiments thereof are illustrated in the drawings by way of example and are described in detail herein. It should be understood, however, that the drawings and the detailed description thereof are not intended to limit the embodiments to the specific forms as disclosed, rather, it is intended to cover all modifications, equivalents and alternatives falling within the spirit and scope of the claims.

DESCRIPTION OF EMBODIMENTS

Representative applications of various aspects of the device and method and the like according to the present disclosure are described below. These examples are described only to add context and to help understand the embodiments described. Therefore, it is apparent to a person skilled in the art that the embodiments described below can be implemented without some or all of the specific details. In other cases, well-known process steps have not been described in detail in order to avoid unnecessarily obscuring the embodiments described. Other applications are possible, and the solutions of the present disclosure are not limited to these examples.

A beam sweeping process in a wireless communication system will be briefly introduced below with reference to FIG. 1A. The right arrow in FIG. 1A indicates the downlink direction from a base station 100 to a terminal device 104, and the left arrow indicates the uplink direction from the terminal device 104 to the base station 100. As shown in FIG. 1A, the base station 100 includes $n_{t\_DL}$ downlink transmitting beams ($n_{t\_DL}$ is a natural number greater than or equal to 1, and exemplified in FIG. 1A as $n_{t\_DL}=9$), and the terminal device 104 includes $n_{r\_DL}$ downlink receiving beams ($n_{r\_DL}$ is a natural number greater than or equal to 1, exemplified in FIG. 1A as $n_{r\_DL}=5$). In addition, in the wireless communication system shown in FIG. 1A, the number of uplink receiving beams $n_{r\_UL}$ of the base station 100 and the coverage of each beam are the same as those of downlink transmitting beams, and the number of uplink transmitting beams $n_{t\_UL}$ of the terminal device 104 and the coverage of each beam are the same as those of downlink receiving beams. It should be understood that, according to the system requirements and settings, the coverage and the number of uplink receiving beams and downlink transmitting beams of a base station may be different, and the same is true for a terminal device.

As shown in FIG. 1A, during a downlink beam sweeping process, each downlink transmitting beam 102 of the $n_{t\_DL}$ downlink transmitting beams of the base station 100 transmits $n_{r\_DL}$ downlink reference signals to the terminal device 104, and the terminal device 104 receives the $n_{r\_DL}$ downlink reference signals through the $n_{r\_DL}$ downlink receiving beams respectively. In this way, the $n_{t\_DL}$ downlink transmitting beams of the base station 100 sequentially transmit $n_{t\_DL} \times n_{r\_DL}$ downlink reference signals to the terminal device 104, and each downlink receiving beam 106 of the terminal device 104 receives $n_{t\_DL}$ downlink reference signals, that is, the $n_{r\_DL}$ downlink receiving beams of the terminal device 104 receive a total of $n_{t\_DL} \times n_{r\_DL}$ downlink reference signals from the base station 100. The terminal device 104 measures the $n_{t\_DL} \times n_{r\_DL}$ downlink reference signals (such as measuring the received signal power of the downlink reference signal (such as RSRP)), so that the downlink transmitting beam of the base station 100 and the downlink receiving beam of the terminal device 104 when the measurement result is better or the best are determined as the matched transmitting and receiving beam pairs of the downlink, and a downlink beam pair is established.

During a uplink beam sweeping process, similar to the downlink beam sweeping, each uplink transmitting beam 106 of the $n_{t\_UL}$ uplink transmitting beams of the terminal device 104 transmits the $n_{r\_UL}$ uplink reference signals to the base station 100, and the base station 100 receives the $n_{r\_UL}$ uplink reference signals through the $n_{r\_UL}$ uplink receiving beams respectively. In this way, the $n_{t\_UL}$ uplink transmitting beams of the terminal device 104 sequentially transmit $n_{t\_UL} \times n_{r\_UL}$ uplink reference signals to the base station 100, and each uplink receiving beam 102 of the base station 100 receives $n_{t\_UL}$ uplink reference signals, that is, the $n_{r\_UL}$ uplink receiving beams of the base station 100 receive a total of $n_{r\_UL} \times n_{t\_UL}$ uplink reference signals from the terminal device 104. The base station 100 measures the $n_{r\_UL} \times n_{t\_UL}$ uplink reference signals (such as measuring the received signal power of the uplink reference signal (such as RSRP)), so that the uplink transmitting beam of the terminal device 104 and the uplink receiving beam of the base station 100 when the measurement result is better or the best are determined as the matched transmitting and receiving beam pairs of the uplink, and an uplink beam pair is established.

It should be understood that the coverage and the number of uplink receiving beams and downlink transmitting beams of a base station may be different and the coverage and the number of uplink transmitting beams and downlink receiving beams of a terminal device may be different, and the above determination operation can still be similarly carried out.

In the above example, the terminal device 104 uses all $n_{r\_DL}$ downlink beams or $n_{t\_UL}$ uplink beams to transmit and receive reference signals in the downlink or uplink beam sweeping process. In embodiments of the present disclosure, such beam sweeping process is referred to as full beam sweeping. In some cases, in order to complete the beam sweeping process fast, the terminal device 104 may use a single beam (such as an omnidirectional beam) for reference signal transmission and reception during the downlink or uplink beam sweeping process. This beam sweeping process may be referred to as fast beam sweeping.

Receiving beams and transmitting beams of a base station and a terminal device can be generated by a Discrete Fourier Transform (DFT) vector. A downlink transmitting beam at a base station side is used below as an example for description. An uplink receiving beam at a base station side and a transmitting beam and a receiving beam at a terminal device side can also be generated by similar methods.

For example, assuming that a base station side is equipped with $n_t$ transmitting antennas, an equivalent channel from the base station to a terminal device can be expressed as one $n_t \times 1$ vector H. The DFT vector u can be expressed as:

$$u = \left[ 1 \ e^{j\frac{2\pi}{C}} \ \ldots \ e^{j\frac{2\pi(n_t-1)}{C}} \right]^T \qquad \text{[Equation 1]}$$

Wherein, the length of the DFT vector u is $n_t$, C represents a parameter for adjusting the beam width and beamforming gain, and "T" represents a transposition operator. One transmitting beam of the base station can be obtained by multiplying the equivalent channel H from the base station to the terminal device by the DFT vector u (for example, one of the downlink transmitting beams shown in FIG. 1A).

In one embodiment, the parameter C for adjusting the beam width and beamforming gain in Equation 1 can be expressed by the product of two parameters $O_2$ and $N_2$, and by adjusting the two parameters $O_2$ and $N_2$, respectively, the beam width and beamforming gain can be adjusted. Generally, the larger the number of antennas $n_t$ or the larger the parameter C (for example, the product of $O_2$ and $N_2$), the stronger the spatial directivity of the obtained beam, but the narrower the beam width in general. In one embodiment, $O_2=1$ and $N_2=1$ can be taken, and the DFT vector u thus obtained is a vector in which $n_t$ elements are all 1.

Figure 1B:
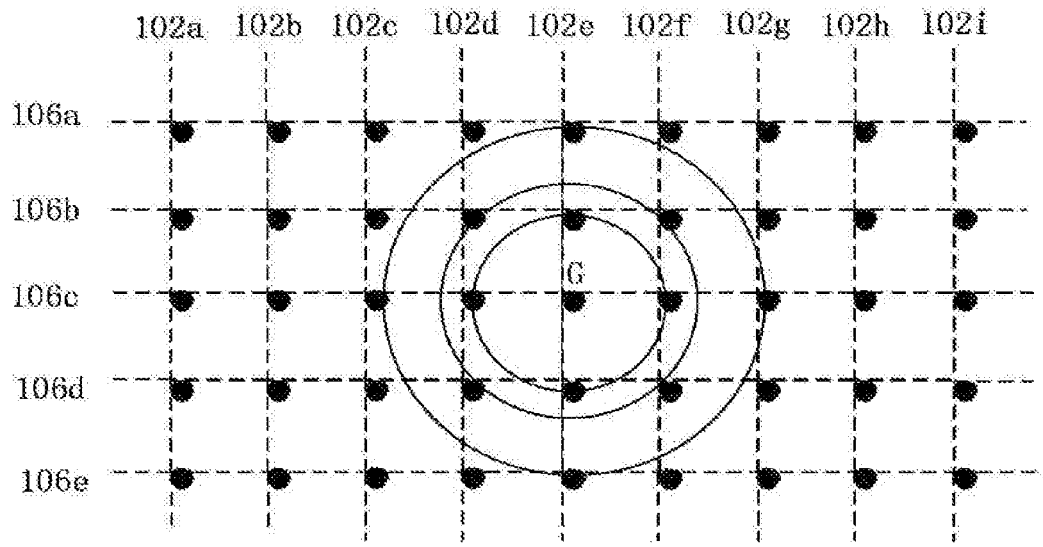

After completing the downlink beam sweeping and uplink beam sweeping processes, following data and/or control signal transmission is performed by utilizing the established beam pair. The process of determining a matching transmitting and receiving beam pair of a base station and a terminal device through beam sweeping described above is sometimes referred to as a Beam Training process. FIG. 1B illustrates a schematic diagram of a beam pair established through a beam training process according to an embodiment of the present disclosure, where the beam pair may be an uplink beam pair or a downlink beam pair. In FIG. 1B, a plurality of beams at a base station side 102 may be labeled as 102a to 102i, and a plurality of beams at a terminal device side 106 may be labeled as 106a to 106e. FIG. 1B illustrates beam pairs established between beams at a base station side and beams at a terminal device side with dots in a matrix. For example, the dot G represents a beam pair (102e, 106c) established between the beams 102e and 106c. The matrix represents beams at the base station side in the spatial order in the horizontal direction, and represents beams at the terminal device side in the spatial order in the vertical direction. The horizontal direction may indicate the spatial pointing distance of each beam at the base station side, and the vertical direction may indicate the spatial pointing distance of each beam at the terminal device side. Accordingly, the matrix can represent the relative spatial pointing relationship between different beam pairs.

In some embodiments, it is needed to consider the relative spatial pointing relationship between beam pairs established by the same beam at the base station side (for example, 102e) with different beams at the terminal device side (for example, 106a to 106e). At this time, the relative spatial pointing relationship between the beam pairs may be represented by the distance between beams at the terminal device side. The beam pairs (102e, 106b), (102e, 106d) are differ with (102e, 106c) by the distance of one beam at the terminal device side, so the beam pairs (102e, 106b), (102e, 106d) are immediately neighboring to (102e, 106c). The beam pairs (102e, 106a), (102e, 106e) are differ with (102e, 106c) by the distance of the two beams at the terminal device side, so the beam pairs (102e, 106a), (102e, 106e) are secondary neighboring to (102e, 106c). The same is true in an embodiment that considers the relative spatial pointing relationship between beam pairs established by the same beam at the terminal device side with different beams at the base station side. That is, the relative spatial pointing relationship between the beam pairs can be represented by the distance between beams at the base station side, and the specific example will not be described here again. In some embodiments, the relative spatial pointing relationship between a beam pair established by any beam at the base station side and any beam at the terminal device side may also be considered. At this time, the relative spatial pointing relationship between beam pairs is related to both the distance between beams at the base station side and the distance between beams at the terminal device side. In one embodiment, the spatial pointing relationship between beam pairs may be indicated by the distance between the dots in the matrix in FIG. 1B. For example, beam pairs indicated by four dots on the inner circle in FIG. 1B are immediately neighboring to the beam pair (102e, 106c) in spatial pointing, and beam pairs indicated by dots on the middle circle are secondary neighboring to the beam pair (102e, 106c) in spatial pointing, and beam pairs indicated by dots on the outer circle are further to the beam pair (102e, 106c) in spatial pointing.

Exemplary Electronic Device

Figure 2:
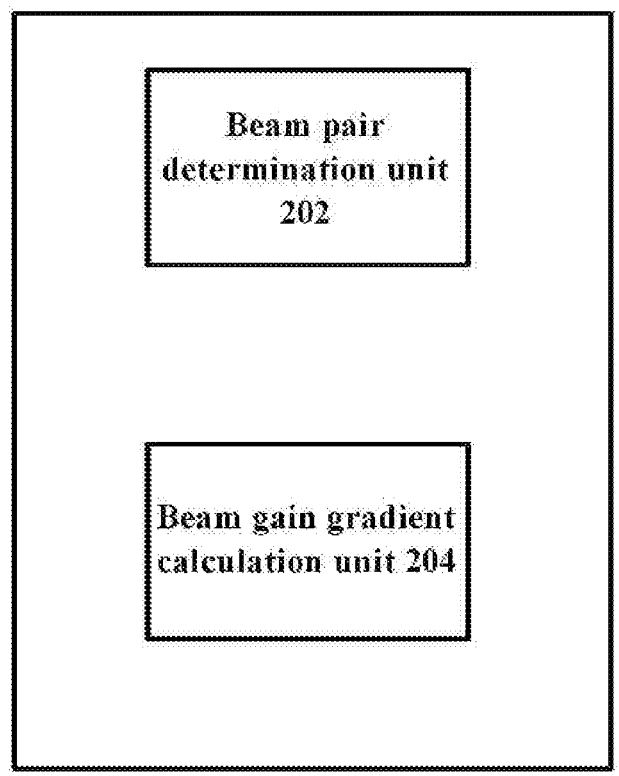
FIG. 2 illustrates an exemplary electronic device according to an embodiment of the present disclosure.

FIG. 2 illustrates an exemplary electronic device according to an embodiment of the present disclosure, where the electronic device can be used in conjunction with various wireless communication systems. The electronic device 200 may include various units to implement various embodiments according to the present disclosure. In the example of FIG. 2, the electronic device 200 may include a beam pair determination unit 202 and a beam gain gradient calculation unit 204. According to one implementation, the electronic device 200 may be implemented as the base station 100 in FIG. 1A or a part of it, or may be implemented as a device for controlling or otherwise related to the base station 100 (for example, a base station controller) or a part of the device. According to another implementation, the electronic device 200 may be implemented as the terminal device 104 in FIG. 1A or a part of it. According to other implementation, the electronic device 200 may also be implemented as other separate functional entities.

In one embodiment, the beam pair determination unit 202 can be configured to determine K beam pairs in a communication link between a first communication apparatus and a second communication apparatus for a wireless communication system, where K is natural number. Each beam pair may include a transmitting beam and a receiving beam, and has corresponding gain level. The first communication apparatus and the second communication apparatus may be any communication apparatus that performs communication transmission and reception through beamforming, including but not limited to a base station and a terminal device. According to one example, the first communication apparatus may be a base station, and the second communication apparatus may be a terminal device; and vice versa.

In one embodiment, the beam gain gradient calculation unit 204 can be configured to calculate a beam gain gradient for each beam pair, where the beam gain gradient may indicate a spatial gain variation of a respective beam pair.

According to some embodiments, the electronic device 200 may be implemented at the chip level, or may also be implemented at the device level by including other external components. For example, each electronic device can work as a communication device as a whole machine.

It should be noted that the above various units are only logical modules divided according to the specific functions they implement, and are not intended to limit specific implementations, for example, they can be implemented in software, hardware, or a combination of software and hardware. In actual implementation, the above various units may be implemented as independent physical entities, or may be implemented by a single entity (for example, a processor (CPU or DSP, etc.), an integrated circuit, or the like). Wherein, the processing circuitry may refer to various implementations of a digital circuitry, an analog circuitry, or a mixed signal (combination of analog and digital) circuitry that perform functions in a computing system. The processing circuitry can comprise, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

In an embodiment of the present disclosure, a beam gain gradient may indicate a spatial gain variation of a beam pair, and may be obtained based on beam pair gains within a certain range. In some examples, the beams of one of the two communication parties have been selected, and the spatial gain variation of multiple beam pairs formed by multiple beams of the other party and the selected beam needs to be considered. In this example, a "beam pair" can be reduced to a "beam" to simplify the discussion. Then, it can also be said that the beam gain gradient is used to indicate a spatial gain variation of a beam. In the embodiments of the present disclosure, the gain is preferably characterized by a received power parameter (for example RSRP, etc.), and may also be characterized by communication quality parameters such as a block error rate (BLER), a signal-to-noise ratio, and the like, for reflecting the beamforming transmission quality of the transmitting end obtained at the receiving end. The variation may be understood as the amount or rate of the spatial gain variation of a beam pair, such as the deviation degree or discrete degree of the gain, or the deviation speed or discrete speed.

Figure 3:
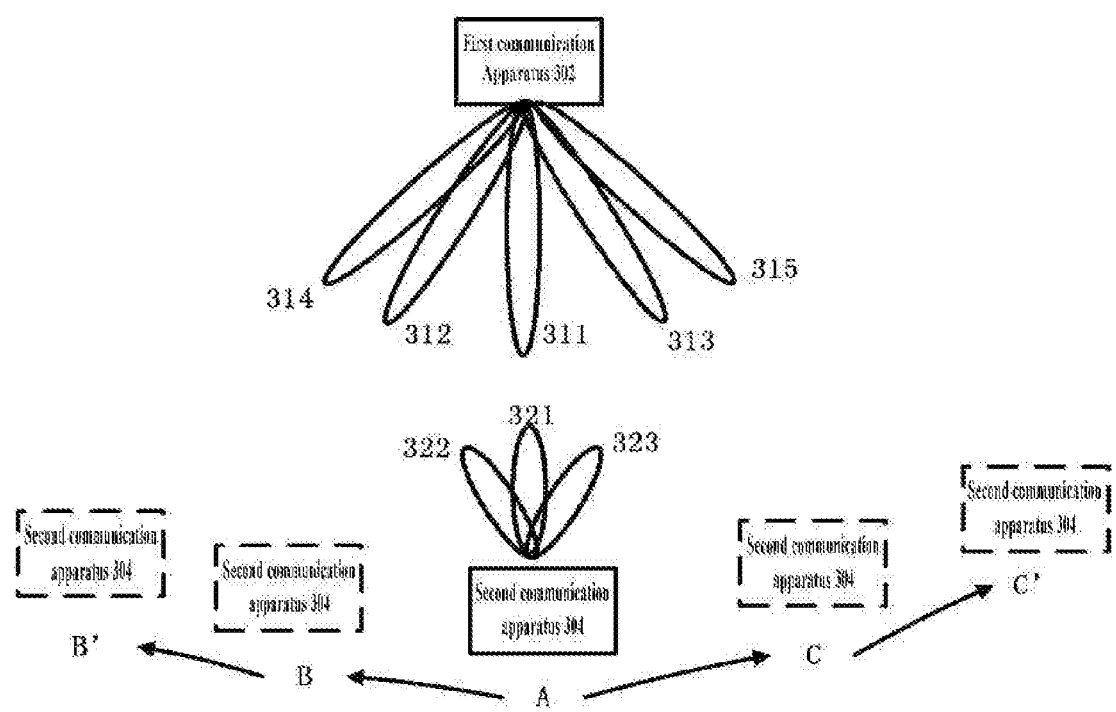
FIG. 3 illustrates a schematic diagram of a beam gain gradient according to an embodiment of the present disclosure.

According to some embodiments, a beam gain gradient for a beam pair at a spatial position may be obtained based on variation between a gain of a particular beam pair and a gain of a beam pair neighboring the particular beam pair in terms of pointing directions. FIG. 3 illustrates a schematic of a beam gain gradient according to these embodiments. In FIG. 3, transceiving communication is performed between a first communication apparatus 302 and a second communication apparatus 304, and the latter is located at one spatial position A relative to the former. Assume that at position A, the first communication apparatus 302 and the second communication apparatus 304 established beam pairs 1 (311, 321), 1' (312, 321), 1" (313, 321), 2' (314, 322) and 2" (315, 323). With reference to the description of FIG. 1B, it can be considered that the beam pairs 1', 1" are immediately neighboring to the beam pair 1 in spatial pointing, and the beam pairs 2', 2" are secondary neighboring to the beam pair 1 in spatial pointing. The gain of the beam pair 1 between the first communication apparatus 302 and the second communication apparatus 304 is 10 (the gain value is only a schematic illustration of the relative number, and does not indicate a specific magnitude, the same applies hereinafter), and the gains of the two beam pairs 1' and 1" immediately neighboring to the pointing direction of beam pair 1 are both 9. Then, in some cases, it can be considered that the variation between the gain (i.e. 10) of beam pair 1 at position A and the gains (i.e. 9) of two beam pairs 1' and 1" immediately neighboring in spatial pointing is not big. Suppose the second communication apparatus 304 next moves to the spatial position B (or C) neighboring to the position A, due to the continuity of the movement and it is known that the variation between the gain of the beam pair 1 at the previous position A and the gain of the neighboring beam pair is not big, then it can be estimated that there is no big variation between the gain of beam pair 1 at the immediately neighboring position B (or C) and the gain at position A, that is, the beam gain gradient for beam pair 1 at position A is small.

Assuming that in the above example, the gain of beam pair 1 is 15, and the gains of both beam pairs 1' and 1" are 5, then it can be similarly estimated that the variation between the gain of the beam pair 1 at position B (or C) and the gain at position A is large, that is, the beam gain gradient for beam pair 1 at position A is also large. As it can be seen, the variation in gain with neighboring beam pairs can reflect a spatial gain variation of a given beam pair, so the gain gradient for the given beam pair can be indicated with the variation in gain with neighboring beam pairs.

Assuming again that in the above example, the gains of the two beam pairs 2' and 2" that are secondary neighboring to the pointing direction of beam pair 1 are both 8, then it can be similarly estimated that the variation between the gain of beam pair 1 at position B' (or C') and the gain at position A is not big, that is, the beam gain gradient for beam pair 1 at position A is small. Both this example and the previous example can be concluded that the beam gain gradient is small, but because the range of neighboring beam pairs considered in this example is wider than the previous example, the beam gain gradient in this example can indicate the gain variation of a given beam pair in wider spatial range. As it can be seen, the range of neighboring beam pairs has a correspondence with the spatial range.

According to other embodiments, the beam gain gradient for a beam pair at one spatial position may be obtained based on the variation between the gain of the beam pair at a spatial position neighboring to the current spatial position and the gain at the current spatial position. Also refer to FIG. 3. Assuming that at position A, the gain of beam pair 1 between the first communication apparatus 302 and the second communication apparatus 304 is 10, and at the spatial positions B and C neighboring to position A, the gains of beam pair 1 are both 9. Then, in some cases, it can be considered that the variation between the gain (i.e. 10) of beam pair 1 at position A and the gains (i.e. 9) at neighboring positions B and C is not big, that is, the beam gain gradient for the beam pair 1 at position A is small. Assume that at position A, the gain of beam pair 1 is 15, and at the spatial positions B and C neighboring to position A, the gains of beam pair 1 are both 5. Then it can be considered that the variation between the gain (i.e. 15) of beam pair 1 at position A and the gains (i.e. 5) at neighboring positions B and C is large, that is, the beam gain gradient for beam pair 1 at position A is big. Similar to the previous example, in this example, it can be estimated, based on similar reasons, that the greater (smaller) the beam gain gradient for beam pair 1 at position A, the bigger (smaller) the variation between the gain of beam pair 1 at position A and the gains of the beam pairs neighboring in pointing direction. Furthermore, the wider the range of neighboring positions considered, the larger the spatial range over which the beam gain gradient can indicate the gain variation of a given beam pair.

Although a beam gain gradient for a beam pair can be obtained by way of different embodiments as described above, the obtained beam gain gradients can all indicate a spatial gain variation of a respective beam pair. For example, the gain variation can be understood as the amount or rate of the variation (e.g., discrete, deviation) between the gain of the corresponding beam pair at neighboring positions and the gain at a given position, or it can be understood as the amount or rate of the variation (e.g., discrete, deviation) between the gain of the neighboring beam pair at a given position and the gain of the beam pair. The beam gain gradient can be calculated in different ways, as will be described in detail below.

Figure 4:
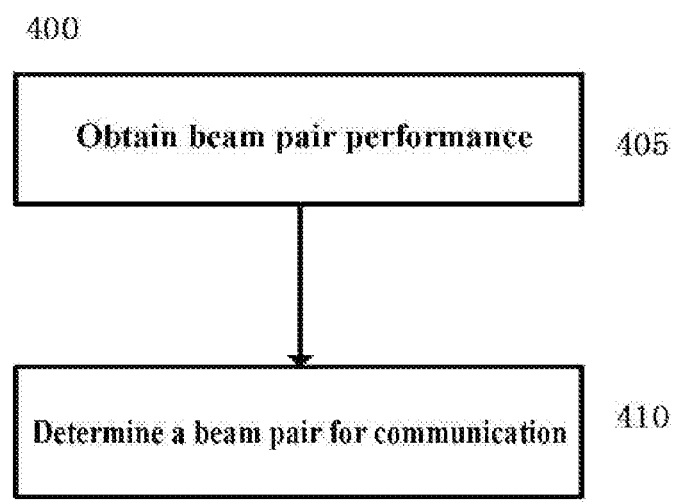
FIG. 4 illustrates an example method of beam pair determination according to an embodiment of the present disclosure.

Some aspects of beam pair determination according to embodiments of the present disclosure are described below with reference to FIGS. 4 to 5D. FIG. 4 illustrates an example method of beam pair determination according to an embodiment of the present disclosure. The method 400 may be performed by the beam pair determination unit 202. The method 400 comprises, for example, obtaining, by the beam pair determination unit 202, a beam pair gain at a given position (405), where the beam pair gain performance is obtained by measuring a signal received power (e.g., RSRP, etc.) or a communication block error rate (BLER), and a signal-to-noise ratio and the like. The higher the signal received power (or signal-to-noise ratio), the higher the beam pair gain. The lower the block error rate, the higher the beam pair gain. In some embodiments, the beam pair gain performance may be determined in real time by the receiving end based on the beam sweeping between the transmitting end and the receiving end (e.g., a first communication apparatus and a second communication apparatus) at given positions or based on the communication between the transmitting end and the receiving end at a given position. In such an embodiment, the beam pair determining unit 202 may obtain the beam gain performance from the receiving end through signaling (for example, in a case where the beam pair determining unit 202 is discrete with the receiving end), or the beam pair determining unit 202 may obtain the beam gain performance from the receiving end directly (for example, in a case where the beam pair determining unit 202 is integrated with the receiving end). In other embodiments, the beam pair gain performance can be pre-determined and stored (for example, by the beam pair determination unit 202 or other device) based on a certain communication channel model by simulating a channel status, a positional relationship, and a beam pointing direction between a transmitting end and a receiving end at given positions. In such an embodiment, in order to determine the beam gain performance, the beam pair determination unit 202 may query the corresponding beam pair gain performance from the stored information based on the positional relationship, the beam pointing direction and/or the channel status between the transmitting end and the receiving end.

The method 400 further comprises determining, by the beam pair determination unit 202, for example, a beam pair for communication (410). In various examples, the K beam pairs determined by the beam pair determination unit 202 may be all the detected beam pairs between the first communication apparatus and the second communication apparatus, may be a predetermined number of beam pairs among all these beam pairs, or may be the portion of these beam pairs that meets a predetermined condition. In some embodiments, the predetermined number may be specified by a communication protocol, or may be negotiated between different entities (e.g., the first communication apparatus, the second communication apparatus, and the electronic device 200). In different embodiments, the beam gain performance of the portion of beam pairs may be required to meet a predetermined condition (for example, the gain level needs to be higher than a predetermined threshold). The predetermined conditions for beam pairs may be different depending on the target to be achieved. For example, in an embodiment with higher beam gain performance requirements (for example, to meet the requirement the rate of the traffic), the predetermined condition is also relatively strict, that is, the beam gain of the determined beam pair is required to be higher than a higher predetermined threshold. In an embodiment where the stability of the beam pair is more important (that is, the beam pair can be used in a larger spatial range without switching beams), the predetermined condition may be moderate (such as being able to meet basic communication needs), that is, as long as the determined beam gain of the beam pair can reach a certain level.

FIGS. 5A and 5B illustrate examples of beam pair determination according to an embodiment of the present disclosure. Wherein, FIG. 5A corresponds to the case of full beam sweeping, and FIG. 5B corresponds to the case of fast beam sweeping. In the example of FIG. 5A, the transmitting end (which may be one of the first and second communication apparatus) may be provided with 16 transmitting beams T1 to T16, and the receiving end (which may be the other of the first and second communication apparatus) may be provided with 4 receiving beams R1 to R4. At a given position, by performing a full beam sweeping with a transmitting end and a receiving end, the receiving end can obtain the beam gain of each pair of transmitting and receiving beams, as shown in FIG. 5A. For example, the gain of the transmitting beam T1 and the receiving beam R1 is 1.5, and the gain of the transmitting beam T16 and the receiving beam R4 is 1.8. In one embodiment (for example, the beam pair determining unit 202 is discrete with the receiving end), the receiving end may provide the beam gain to the beam pair determining unit 202 through signaling. In another embodiment (for example, the beam pair determining unit 202 is integrated with the receiving end), the beam pair determining unit 202 may obtain the beam gain directly from the receiving end. Alternatively, the beam gain in FIG. 5A may also be pre-determined and stored by way of emulation and simulation, as described above. Accordingly, the beam pair determining unit 202 may query the corresponding beam pair gain performance from the stored information based on the positional relationship, the beam pointing direction and/or the channel status between the transmitting end and the receiving end. Next, the beam pair determination unit 202 may determine all of beam pairs or a predetermined number of beam pairs for communication, or may determine those beam pairs that satisfy a predetermined condition for communication. For example, if the predetermined number is 2 beam pairs, the beam pair determination unit 202 may determine the 2 beam pairs with the highest gain, that is, (T6, R3) with a gain of 19.6 and (T13, R4) with a gain of 17.4 are used for communication.

In the example of FIG. 5B, the transmitting end may also be provided with 16 transmitting beams T1 to T16. Due to the fast beam sweeping to be performed, the receiving end is provided with only 1 receiving beam. The beam gain of each pair of transmitting and receiving beams obtained by the receiving end is shown in FIG. 5B. The beam pair determination unit 202 may similarly obtain a beam gain situation at a given position, and may determine that all of beam pairs or a predetermined number of beam pairs for communication, or may determine those beam pairs that satisfy a predetermined condition for communication. For example, if the predetermined condition requires that the gain of the beam pair should be higher than 16, the beam pair determination unit 202 may determine that the beam pairs (T6, R1) and (T12, R1) with gains of 19.6 and 16.8, respectively, are for communication.

Figure 5C:
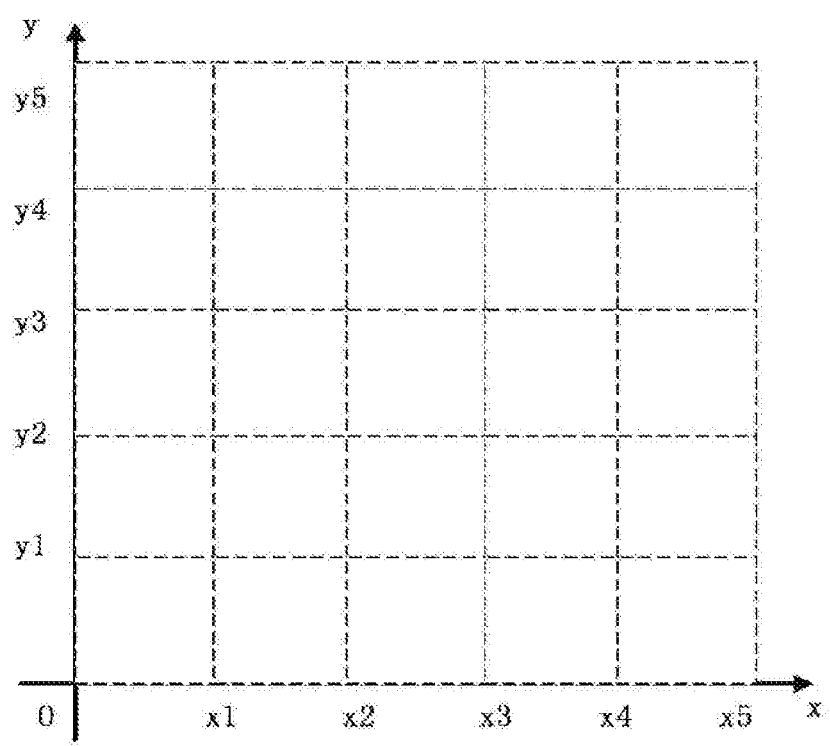

As described with reference to FIGS. 5A and 5B, gain performance of multiple beam pairs between a transmitting end and a receiving end at a certain position can be obtained, such as by beam sweeping at the position, actual communication measurement, or by way of simulation and storage in advance. In this way, if the performance of each beam pair at multiple positions is obtained, the gain performance of the beam pair corresponding to the spatial position can be obtained. As shown in FIG. 5C, the two-dimensional plane may be divided into a plurality of square unit regions, and the unit region is represented by a vertex coordinate (x, y). It is assumed that the receiving end moves in a two-dimensional plane coordinate system, and the transmitting end is stationary at the origin (in the case of other relative movements of the receiving end and the transmitting end, the following descriptions still apply). According to some embodiments, the receiving end may accumulate the beam gain of each beam pair at a corresponding position as it moves in the plane. For example, if the receiving end uses the beam pair (T1, R1) to communicate at the position (x1, y1) and the corresponding beam gain is 1.5, the receiving end may associate the beam pair (T1, R1), the position (x1, y1) with beam gain 1.5. For another example, if the receiving end performs beam sweeping at the position (x2, y2) and obtains the beam gain of each beam pair between the transmitting beams T1 to T2 and the receiving beams R1 to R2, the receiving end may associate each beam pair, the position (x2, y2) with the corresponding beam gain. According to other embodiments, the beam gain of each beam pair at a corresponding position may be simulated and stored in advance by means of channel modeling.

The beam gain of each beam pair formed in this way is shown in FIG. 5D. In the example of FIG. 5D, the transmitting end and the receiving end (which may be either of the first and second communication apparatus) may be respectively provided with 2 transmitting beams T1, T2 or 2 receiving beams R1, R2. In FIG. 5D, the gain of each beam pair may correspond to a table, and each table may include the gain of the corresponding beam pair with position. Specifically, Tables 1 to 4 are the beam gains of beam pairs (T1, R1), (T1, R2), (T2, R1), and (T2, R2), respectively. For example, the beam gain of beam pair (T1, R1) at position (x1, y1) is 1.5, and the beam gain of beam pair (T2, R1) at position (x5, y5) is 2.8. Similarly, the beam gain in FIG. 5A is only a relatively high and low level, and does not indicate the absolute gain value.

Although example manner of obtaining beam gains of beam pairs at different positions in a plane has been shown above, those skilled in the art can similarly apply this manner to a three-dimensional space. At this time, the three-dimensional space needs to be divided into unit spaces, and beam gains of each beam pair at different unit spaces are obtained.

Beam Gain Gradient Calculation

Figure 6:
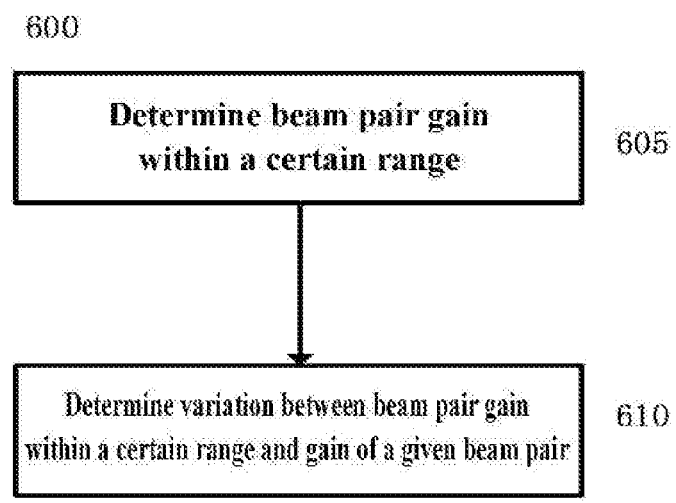
FIG. 6 illustrates an example method of beam gain gradient calculation according to an embodiment of the present disclosure.

Some aspects of beam gain gradient calculation according to an embodiment of the present disclosure are described below with reference to FIGS. 6 to 8C. FIG. 6 illustrates an example method of beam gain gradient calculation according to an embodiment of the present disclosure. The method 600 may be performed by the beam gain gradient calculation unit 204. The method 600 comprises determining by, for example, the beam gain gradient calculation unit 204, beam pair gains within a certain range 605. According to an embodiment of the present disclosure, the beam gain gradient is calculated based on the variation between multiple beam pair gains, and thus the range of beam pair gains on which the calculation is based needs to be determined. As described with reference to FIG. 3, this range of beam pair gains actually corresponds to a certain spatial range. The gradient radius R can be used to indicate beam pair gains of the range or the corresponding spatial range, where R is a natural number.

According to some embodiments, for each beam pair of the K beam pairs, it can be determined variation between a gain of a particular beam pair and a gain of a beam pair neighboring the particular beam pair in terms of pointing directions, in order to calculate the beam gain gradient. In the embodiment herein, the beam pair gain in the range above may include the gain of the beam pair neighboring to the pointing direction of the given beam pair, and the range with a gradient radius R may include gains of beam pairs within R transmitting beams from that of a given beam pair and/or within R receiving beams from that of a given beam pair, refer to the detailed description of examples 1 to 3 below.

According to other embodiments, for each beam pair of the K beam pairs, it can be determined variation between a gain of a particular beam pair at a current spatial position and a gain of the particular beam pair at a neighboring spatial position, in order to calculate the beam gain gradient. Here, gains of beam pairs in the range above may include the gain of a given beam pair at a spatial position neighboring to the current position, and the range with a gradient radius R may include a gain of a given beam pair at a unit spatial position within R unit distances from the current position, refer to the detailed description of example 4 below.

The method 600 further comprises determining variation between gains of beam pairs within a certain range and the gain of a given beam pair to calculate a beam gain gradient for the given beam pair. In one embodiment, the beam gain gradient can be calculated based on the variation between all gains of beam pairs within the range indicated by the gradient radius R. However, for calculation flexibility or to be able to perform calculations even when information such as beam gain is limited, it can also be based on only a part of the beam pairs within the range indicated by R (this part should include gains of at least a portion of beam pairs at the gradient radius R) to calculate the beam gain gradient.

A specific example of calculating a beam gain gradient according to an embodiment of the present disclosure is described below.

Beam Gain Gradient Calculation Example 1

In one embodiment, beam pairs neighboring in terms of the pointing direction may be multiple beam pairs that are neighboring to the transmitting beam of a given beam pair and have the same receiving beam as the given beam pair. At this time, the beam gain gradient for the given beam pair may be calculated based on the beam gain of the beam pair that has the same receiving beam as that of the given beam pair and is within R beams from the transmitting beam of the given beam pair. FIG. 7A illustrates a corresponding example of calculating a beam gain gradient according to an embodiment of the present disclosure. The beam gain gradient calculation in FIG. 7A is based on the gain results of each beam pair obtained in FIG. 5A. That is, in one embodiment, after obtaining the beam pair gain as shown in FIG. 5A, the beam gain gradient may be calculated according to the example of FIG. 7A. It is to be understood that this example calculation method is particularly applicable to a scenario in which the receiving beam at the receiving end is unchanged and the transmitting beam at the transmitting end may be changed during the transceiving communication. One example could be a scenario where the receiving end moves around the transmitting end.

According to one example, the beam gain gradient calculation unit 204 may determine gradient radius of each beam pair as in 605, and calculate beam gain gradient for the beam pair (for example, the beam pair determined by the beam pair determination unit 202) based on the gradient radius. In this and other embodiments, the value of the gradient radius R may be set based on the spatial range of interest. For example, the faster the moving speed of the receiving end (in one example, the speed of the moving speed can be determined by the number of beam pairs switched by the receiving end. The larger the number, the faster the moving speed), the larger the spatial range it passes. In order to evaluate the gain variation of the beam gain in this spatial range, the gradient radius R can be set larger. In these embodiments, different R values may be used for different beam pairs to calculate corresponding beam gain gradients. At this time, if the beam gain gradients are not significantly different, the gain of the beam pair with a larger R value can be stable over a larger range. For example, the R value of a beam pair with a low gain may be set to be greater than the R value of a beam pair with a high gain.

In one example, in a case where the beam pair determination unit 202 determines that the beam pairs (T6, R3) and (T13, R4) are available for communication, the beam gain gradient calculation unit 204 calculates beam gain gradients for beam pairs (T6, R3) and (T13, R4). Here, for example, the gradient radius R=1 is taken. Therefore, the beam gain gradient for the beam pair (T6, R3) can be calculated based on gains of the beam pairs (T5, R3) and (T7, R3) which have the same receiving beam as that of the beam pair (T6, R3), and the beam gain gradient for the beam pair (T13, R4) can be calculated based on the beam pairs (T12, R4) and (T14, R4) which have the same receiving beam as that of the beam pair (T13, R4), as shown in the range delineated by the thick line in FIG. 7A. It is to be understood that if R=2, the beam gain gradient for the beam pair (T6, R3) can be calculated based on gains of the beam pairs (T4, R3), (T5, R3) and (T7, R3), (T8, R3), and the beam gain gradient for the beam pair (T13, R4) can be calculated based on gains of the beam pairs (T11, R4), (T12, R4) and (T14, R4), (T15, R4).

The beam gain gradient can have multiple forms of calculation or evaluation. According to one example, a given beam pair includes a receiving beam m and a transmitting beam n, with a beam gain $\tilde{G}_{m,n}$, and a gradient radius R, then, the beam gain gradient $\nabla G_{m,n}$ here can be calculated according to the example form of the following equations 1 to 3, that is, $$\nabla G_{m,n} = f(m, n, R, \tilde{G}) = \frac{1}{2\tilde{G}_{m,n}} \sum_{i=1}^{R} \frac{1}{i} \left( \left| \tilde{G}_{m,n-i} - \tilde{G}_{m,n} \right| + \left| \tilde{G}_{m,n+i} - \tilde{G}_{m,n} \right| \right),$$ (Equation 1)

-continued $$\nabla G_{m,n} = f(m, n, R, \tilde{G}) = \qquad \text{(Equation 2)}$$

$$\frac{1}{2|\tilde{G}_{m,n}|^2} \sum_{i=1}^{R} \frac{1}{i} \left( |\tilde{G}_{m,n-i} - \tilde{G}_{m,n}|^2 + |\tilde{G}_{m,n+i} - \tilde{G}_{m,n}|^2 \right),$$

$$\nabla G_{m,n} = f(m, n, R, \tilde{G}) = \qquad \text{(Equation 3)}$$

$$\frac{1}{2R} \sum_{i=1}^{R} \left( \frac{|\tilde{G}_{m,n-i} - \tilde{G}_{m,n-i+1}|}{\tilde{G}_{m,n-i+1}} + \frac{|\tilde{G}_{m,n+i} - \tilde{G}_{m,n+i-1}|}{\tilde{G}_{m,n+i-1}} \right),$$

Wherein, G represents the gain of each beam pair, e.g., it can be the form of FIG. 5A (or FIG. 5B). An example process of calculating the beam gain gradient for the beam pair (T6, R3) according to Equation 1 is as follows. Let R=1, for beam pairs (T6, R3), there is (m, n, R, $\tilde{G}$)=(3, 6, 1, $\tilde{G}$), then $$f(3, 6, 1, \tilde{G}) = \frac{1}{2 \cdot 19.6} \sum_{i=1}^{1} \frac{1}{i} \left( |\tilde{G}_{3,6-i} - \tilde{G}_{3,6}| + |\tilde{G}_{3,6+i} - \tilde{G}_{3,6}| \right) =$$

$$\frac{1}{39.2} \left( |\tilde{G}_{3,5} - \tilde{G}_{3,6}| + |\tilde{G}_{3,7} - \tilde{G}_{3,6}| \right) =$$

$$\frac{1}{39.2} (|13.2 - 19.6| + |6.5 - 19.6|) = 0.50,$$

Let $R = 2$, then $$f(3, 6, 2, \tilde{G}) = \frac{1}{2 \cdot 19.6} \sum_{i=1}^{2} \frac{1}{i} \left( |\tilde{G}_{3,6-i} - \tilde{G}_{3,6}| + |\tilde{G}_{3,6+i} - \tilde{G}_{3,6}| \right) =$$

$$\frac{1}{39.2} \left[ \left( |\tilde{G}_{3,5} - \tilde{G}_{3,6}| + |\tilde{G}_{3,7} - \tilde{G}_{3,6}| \right) + \frac{1}{2} \left( |\tilde{G}_{3,4} - \tilde{G}_{3,6}| + |\tilde{G}_{3,8} - \tilde{G}_{3,6}| \right) \right] =$$

$$\frac{1}{39.2} \left[ (|13.2 - 19.6| + |6.5 - 19.6|) + \frac{1}{2} (|4.5 - 19.6| + |4.4 - 19.6|) \right] =$$

0.089,

The process of calculating the beam gain gradient for the beam pair (T13, R4) according to Equation 1 is similar to the above, and will not be repeated again. In different examples, Equation 2, Equation 3, or other suitable methods may be used to calculate the beam gain gradient, and the present disclosure is not limited in this regard.

Beam Gain Gradient Calculation Example 2

In one embodiment, beam pairs neighboring in terms of the pointing direction may be multiple beam pairs that have the same transmitting beam as that of a given beam pair and are neighboring to the receiving beam. At this time, the beam gain gradient for the given beam pair may be calculated based on the beam gain of the beam pair that has the same transmitting beam as that of the given beam pair and is within R beams from the receiving beam of the given beam pair. FIG. 7B illustrates a corresponding example of calculating a beam gain gradient according to an embodiment of the present disclosure. Similarly, the beam gain gradient calculation in FIG. 7B is based on the beam pair gain results of each beam obtained in FIG. 5A. It is to be understood that this example calculation method is particularly applicable to a scenario in which the transmitting beam at the transmitting end is unchanged and the receiving beam at the receiving end may be changed during the transceiving communication. One example could be a scenario where the receiving end does not have spatial position movement in respect to the transmitting end, but rotates in situ.

In one example, in a case where the beam pair determination unit 202 determines that the beam pairs (T6, R3) and (T13, R4) are available for communication, the beam gain gradient calculation unit 204 calculates beam gain gradients for beam pairs (T6, R3) and (T13, R4). Here, the beam gain gradient calculation unit 204 may, for example, determine a gradient radius of each beam pair R=1. Therefore, the beam gain gradient for the beam pair (T6, R3) can be calculated based on the gain of the beam pairs (T6, R2) and (T6, R4) which have the same transmitting beam as that of the beam pair (T6, R3), and the beam gain gradient for the beam pair (T13, R4) can be calculated based on the beam pair (T13, R3) which has the same transmitting beam as that of (T13, R4), as shown in the range delineated by the thick line in FIG. 7B. This is one example of calculating gain gradient for a beam pair based on a portion of the beam pair gain within a range indicated by the gradient radius. Here, since it can only be determined that the beam pair (T13, R3) and the beam pair (T13, R4) point in the same direction and are neighboring, the corresponding gain gradient for the beam is calculated solely based on the beam pair (T13, R3). If it can be determined that other beam pairs (for example, beam pair (T13, R1)) are also pointing in the same direction as and neighboring to beam pair (T13, R4), the corresponding gain gradient for the beam can also be calculated based on the gain of the beam pair (T13, R1). Of course, for the sake of calculation flexible and simple, the beam gain gradient for the beam pair (T6, R3) can also be calculated based only on the gain of the beam pair (T6, R2) or (T6, R4).

According to one example, the beam gain gradient here can be calculated according to the example forms shown in the following Equations 4 to 6, where the meanings of the symbols are the same as that of Example 1.

$$\nabla G_{m,n} = f(m, n, R, \tilde{G}) = \qquad \text{(Equation 4)}$$

$$\frac{1}{2\tilde{G}_{m,n}} \sum_{i=1}^{R} \frac{1}{i} \left( |\tilde{G}_{m-i,n} - \tilde{G}_{m,n}| + |\tilde{G}_{m+i,n} - \tilde{G}_{m,n}| \right),$$

$$\nabla G_{m,n} = f(m, n, R, \tilde{G}) = \qquad \text{(Equation 5)}$$

$$\frac{1}{2|\tilde{G}_{m,n}|^2} \sum_{i=1}^{R} \frac{1}{i} \left( |\tilde{G}_{m-i,n} - \tilde{G}_{m,n}|^2 + |\tilde{G}_{m+i,n} - \tilde{G}_{m,n}|^2 \right),$$

$$\nabla G_{m,n} = f(m, n, R, \tilde{G}) = \qquad \text{(Equation 6)}$$

$$\frac{1}{2R} \sum_{i=1}^{R} \left( \frac{|\tilde{G}_{m-i,n} - \tilde{G}_{m-i+1,n}|}{\tilde{G}_{m-i+1,n}} + \frac{|\tilde{G}_{m+i,n} - \tilde{G}_{m+i-1,n}|}{\tilde{G}_{m+i-1,n}} \right),$$

The process of calculating beam gain gradients for beam pairs (T6, R3) and (T13, R4) according to various equations is similar to that in Example 1, and will not be repeated again.

Beam Gain Gradient Calculation Example 3

In one embodiment, beam pairs neighboring in terms of the pointing direction may be multiple beam pairs that are neighboring to both the transmitting beam and the receiving beam of a given beam pair. At this time, the beam gain gradient for the given beam pair may be calculated based on beam gains of beam pairs within a range of R beams from the transmitting beam of the given beam pair and within a range of R beam from the receiving beam of the given beam pair. FIG. 7C illustrates a corresponding example of calculating a beam gain gradient according to an embodiment of the present disclosure. Similarly, the beam gain gradient calculation in FIG. 7C is based on the beam pair gain results of each beam obtained in FIG. 5A. It is to be understood that this example calculation method is particularly applicable to a scenario in which the transmitting beam at the transmitting end and the receiving beam at the receiving end may change during the transceiving communication.

The example of calculating the beam gain gradient in FIG. 7C has the same idea with the examples in FIG. 7A and FIG. 7B, except that the ranges of beam pair gain on which the calculation is based are different. For example, in a case where the beam gain gradient calculation unit 204 determines that the gradient radius of each beam pair R=1, in the example of FIG. 7C, the beam gain gradient for the beam pair (T6, R3) can be calculated based on the gains of the beam pairs (T5, R2) to (T7, R4), and the beam gain gradient for the beam pair (T13, R4) can be calculated based on the gains of the beam pairs (T12, R3) to (T14, R4), as shown in the range delineated by the thick line in FIG. 7C. Similarly, if it can be determined that other beam pairs (for example, beam pairs (T12, R1) to (T14, R1)) are also pointing in the same direction as and neighboring to the beam pair (T13, R4), the corresponding beam gain gradient can also be calculated based on gains of these beam pairs. Of course, for the sake of calculation flexible and simple, the beam gain gradient for the beam pair (T6, R3) can also be calculated based only on the gains of a portion of the beam pairs (T5, R2) to (T7, R4).

According to one example, the beam gain gradient here can be calculated according to the example forms shown in the following Equations 7 to 9, where the meaning of symbols are the same as that of Examples 1 and 2.

$$\nabla G_{m,n} = f(m, n, R, \tilde{G}) = \quad \text{(Equation 7)}$$

$$\frac{1}{4\tilde{G}_{m,n}} \sum_{i=1}^{R} \frac{1}{i} (|\tilde{G}_{m,n-i} - \tilde{G}_{m,n}| + |\tilde{G}_{m,n+i} - \tilde{G}_{m,n}| +$$
$$|\tilde{G}_{m-i,n} - \tilde{G}_{m,n}| + |\tilde{G}_{m+i,n} - \tilde{G}_{m,n}| +$$
$$|\tilde{G}_{m-i,n-i} - \tilde{G}_{m,n}| + |\tilde{G}_{m+i,n+i} - \tilde{G}_{m,n}| +$$
$$|\tilde{G}_{m-i,n+i} - \tilde{G}_{m,n}| + |\tilde{G}_{m+i,n-i} - \tilde{G}_{m,n}|),$$

$$\nabla G_{m,n} = f(m, n, R, \tilde{G}) = \quad \text{(Equation 8)}$$

$$\frac{1}{4|\tilde{G}_{m,n}|^2} \sum_{i=1}^{R} \frac{1}{i} (|\tilde{G}_{m,n-i} - \tilde{G}_{m,n}|^2 + |\tilde{G}_{m,n+i} - \tilde{G}_{m,n}|^2 +$$
$$|\tilde{G}_{m-i,n} - \tilde{G}_{m,n}|^2 + |\tilde{G}_{m+i,n} - \tilde{G}_{m,n}|^2 +$$
$$|\tilde{G}_{m-i,n-i} - \tilde{G}_{m,n}|^2 + |\tilde{G}_{m+i,n+i} - \tilde{G}_{m,n}|^2 +$$
$$|\tilde{G}_{m-i,n+i} - \tilde{G}_{m,n}|^2 + |\tilde{G}_{m+i,n-i} - \tilde{G}_{m,n}|^2),$$

$$\nabla G_{m,n} = f(m, n, R, \tilde{G}) = \quad \text{(Equation 9)}$$

$$\frac{1}{4R} \sum_{i=1}^{R} \left( \frac{|\tilde{G}_{m,n-i} - \tilde{G}_{m,n-i+1}|}{\tilde{G}_{m,n-i+1}} + \frac{|\tilde{G}_{m,n+i} - \tilde{G}_{m,n+i-1}|}{\tilde{G}_{m,n+i-1}} + \right.$$
$$\frac{|\tilde{G}_{m-i,n} - \tilde{G}_{m-i+1,n}|}{\tilde{G}_{m-i+1,n}} + \frac{|\tilde{G}_{m+i,n} - \tilde{G}_{m+i-1,n}|}{\tilde{G}_{m+i-1,n}} +$$
$$\frac{|\tilde{G}_{m-i,n-i} - \tilde{G}_{m-i+1,n-i+1}|}{\tilde{G}_{m-i+1,n-i+1}} +$$
$$\frac{|\tilde{G}_{m+i,n+i} - \tilde{G}_{m+i-1,n+i-1}|}{\tilde{G}_{m+i-1,n+i-1}} +$$
$$\frac{|\tilde{G}_{m-i,n+i} - \tilde{G}_{m-i+1,n+i-1}|}{\tilde{G}_{m-i+1,n+i-1}} +$$
$$\left. \frac{|\tilde{G}_{m+i,n-i} - \tilde{G}_{m+i-1,n-i+1}|}{\tilde{G}_{m+i-1,n-i+1}} \right)$$

The process of calculating beam gain gradients for the beam pairs (T6, R3) and (T13, R4) according to various equations is similar to that in Examples 1 and 2, and will not be repeated again.

In some embodiments, the beam gain gradient for the beam pair can be calculated based on beam gains of beam pairs which have the same receiving beam as that of a given beam pair and are within R beams from the transmitting beam of the given beam pair, and on beam gains of beam pairs which have the same transmitting beam as a given beam pair and are within R beams from the receiving beam of the given beam pair. It is to be understood that the range of the beam pair gains here is a union of Example 1 and Example 2 above. The corresponding calculation methods are shown in Equation 10 to Equation 12 below.

$$\nabla G_{m,n} = f(m, n, R, \tilde{G}) = \quad \text{(Equation 10)}$$

$$\frac{1}{4\tilde{G}_{m,n}} \sum_{i=1}^{R} \frac{1}{i} (|\tilde{G}_{m,n-i} - \tilde{G}_{m,n}| + |\tilde{G}_{m,n+i} - \tilde{G}_{m,n}| +$$
$$|\tilde{G}_{m-i,n} - \tilde{G}_{m,n}| + |\tilde{G}_{m+i,n} - \tilde{G}_{m,n}|),$$

$$\nabla G_{m,n} = f(m, n, R, \tilde{G}) = \quad \text{(Equation 11)}$$

$$\frac{1}{4|\tilde{G}_{m,n}|^2} \sum_{i=1}^{R} \frac{1}{i} (|\tilde{G}_{m,n-i} - \tilde{G}_{m,n}|^2 + |\tilde{G}_{m,n+i} - \tilde{G}_{m,n}|^2 +$$
$$|\tilde{G}_{m-i,n} - \tilde{G}_{m,n}|^2 + |\tilde{G}_{m+i,n} - \tilde{G}_{m,n}|^2),$$

$$\nabla G_{m,n} = f(m, n, R, \tilde{G}) = \quad \text{(Equation 12)}$$

$$\frac{1}{4R} \sum_{i=1}^{R} \left( \frac{|\tilde{G}_{m,n-i} - \tilde{G}_{m,n-i+1}|}{\tilde{G}_{m,n-i+1}} + \frac{|\tilde{G}_{m,n+i} - \tilde{G}_{m,n+i-1}|}{\tilde{G}_{m,n+i-1}} + \right.$$
$$\left. \frac{|\tilde{G}_{m-i,n} - \tilde{G}_{m-i+1,n}|}{\tilde{G}_{m-i+1,n}} + \frac{|\tilde{G}_{m+i,n} - \tilde{G}_{m+i-1,n}|}{\tilde{G}_{m+i-1,n}} \right).$$

FIG. 7D illustrates another example of calculating a beam gain gradient according to an embodiment of the present disclosure. The beam gain gradient calculation in FIG. 7D is based on the gain results of each beam pair obtained in FIG. 5B. In this example, due to the fast beam sweeping to be performed, the receiving end has only one receiving beam, so the beam gain gradient can and can only be calculated based on the range of beam pair gains and calculation form similar to those in Example 1. Based on the above teachings, the ordinary skilled in the art can perform this calculation process, and thus will not be described here.

Beam Gain Gradient Calculation Example 4

According to other embodiments, for each beam pair of the K beam pairs, it can be determined variation between a gain of a particular beam pair at a current spatial position and a gain of the particular beam pair at a neighboring spatial position, in order to calculate the beam gain gradient. FIG. 8A to 8C illustrate respective examples of calculating a beam gain gradient according to an embodiment of the present disclosure. The beam gain gradient calculations in FIGS. 8A to 8C are based on the gain results of each beam pair obtained in FIG. 5C. In one embodiment, after the beam pair gain is obtained as shown in FIG. 5C, the beam gain gradient may be calculated according to the example of one of FIGS. 8A to 8C.

The foregoing examples 1 to 3 calculate the beam gain gradients based on the beam gains of different beam pairs between the receiving end and the transmitting end at the same position. Unlike Examples 1 to 3, Example 4 will calculate the beam gain gradient based on the beam gains of the same beam pair at different spatial positions. According to one example, the beam gain gradient calculation unit 204 may determine gradient radius of each beam pair, and calculate a beam gain gradient for the beam pair (for example, the beam pair determined by the beam pair determination unit 202) based on the gradient radius.

In some examples, the beam pair determination unit 202 determines that, at a given position of interest (for example, position (x3, y3) in FIG. 5), the beam pairs (T1, R1) to (T2, R2) can all be available for communication, the beam gain gradient calculation unit 204 then calculates the beam gain gradient for the corresponding beam pair at the given position. The beam gain gradient may be calculated based on the beam gains of the same beam pair at different spatial positions along a single direction, or the beam gain gradient may be calculated based on the beam gains of the same beam pair at different spatial positions in a certain area. For example, FIG. 8A illustrates an example of calculating beam gain gradient based on beam gains of a beam pair at different spatial positions along the x-axis direction. If taking the gradient radius R=1, the beam gain gradient for corresponding beam pair at the position (x3, y3) can be calculated based on gains at the positions (x2, y3) and (x4, y3), as shown in the range delineated by the thick line in FIG. 8A. If taking R=2, the beam gain gradient for corresponding beam pair at the position (x3, y3) can be calculated based on gains at the positions (x1, y3), (x2, y3) and (x4, y3), (x5, y3).

Similarly, the beam gain gradient here can have multiple forms of calculation or evaluation. According to one example, given the spatial position (x, y), and the beam gain of the beam pair at the given position is expressed as $\tilde{G}_{y,x}$, and the gradient radius is expressed as R, then the beam gain gradient here can be calculated according to the example method shown in Equation 13 below, that is $$\nabla G_{y,x} = f(y, x, R, \tilde{G}) = \frac{1}{2\tilde{G}_{y,x}} \sum_{i=1}^{R} \frac{1}{i} (|\tilde{G}_{y,x-i} - \tilde{G}_{y,x}| + |\tilde{G}_{y,x+i} - \tilde{G}_{y,x}|),$$
(Equation 13)

Wherein, $\tilde{G}$ represents the gain of each beam pair, e.g., it can be in the form of FIG. 8A (or FIGS. 8B and 8C). Let R=1, and calculating the beam gain gradient for the beam pair at the position (x3, y3) according to Equation 1, for beam pair (T1, R1), there is (y, x, R, $\tilde{G}$)=(3, 3, 1, $\tilde{G}$), and for beam pair (T1, R2), there is (y, x, R, $\tilde{G}$)=(3, 3, 1, 6.5), and for beam pair (T2, R1), there is (y, x, R, $\tilde{G}$)=(3, 3, 1, 4.9), and for beam pair (T2, R2), there is (y, x, R, $\tilde{G}$)=(3, 3, 1, 1.2). Substituting above values into Equation 1, then beam gain gradients for each beam pair along the x-axis at the position (x3, y3) are obtained as 0.54, 1.17, 1.34, and 1.67, respectively.

FIG. 8B illustrates an example of calculating a beam gain gradient based on beam gains of beam pairs at different spatial positions in the y-axis direction. FIG. 8B can be similarly understood with reference to the description of FIG. 8A.

FIG. 8C illustrates an example of calculating a beam gain gradient based on beam gains of a beam pair at different spatial positions centered at a given position. If taking the gradient radius R=1, the beam gain gradient for corresponding beam pair at the position (x3, y3) can be calculated based on gains at positions (x2, y2) to (x4, y4), as shown in the range delineated by the thick line in FIG. 8C. If taking R=2, the beam gain gradient for corresponding beam pair at the position (x3, y3) can be calculated based on gains at positions (x1, y1) to (x5, y5).

Similarly, the beam gain gradient here can have multiple forms of calculation or evaluation. According to one example, given the spatial position (x, y), and the beam gain of the beam pair at the given position is expressed as $\tilde{G}_{y,x}$, and the gradient radius is expressed as R, then the beam gain gradient here can be calculated according to the example method shown in Equation 14 below, that is $$\nabla G_{y,x} = f(y, x, R, \tilde{G}) =$$
(Equation 14)
$$\frac{1}{4\tilde{G}_{y,x}} \sum_{i=1}^{R} \frac{1}{i} (|\tilde{G}_{y,x-i} - \tilde{G}_{y,x}| + |\tilde{G}_{y,x+i} - \tilde{G}_{y,x}| +$$
$$|\tilde{G}_{y-i,x} - \tilde{G}_{y,x}| + |\tilde{G}_{y+i,x} - \tilde{G}_{y,x}| +$$
$$|\tilde{G}_{y-i,x-i} - \tilde{G}_{y,x}| + |\tilde{G}_{y+i,x+i} - \tilde{G}_{y,x}| +$$
$$|\tilde{G}_{y-i,x+i} - \tilde{G}_{y,x}| + |\tilde{G}_{y+i,x-i} - \tilde{G}_{y,x}|),$$

Let R=1, and calculating the beam gain gradient for the beam pair at the position (x3, y3) according to Equation 1, substituting the values of the different beam pairs into Equation 14, then obtaining the beam gain gradient of each beam pair in the area centered at position (x3, y3).

In FIGS. 8A to 8C, the calculation of the beam gain gradient for a given beam pair depends on beam pair gains in a certain range. In actual calculations, beam pair gains in this range can be obtained in a variety of methods. One method is to determine them in real time based on beam sweeping or communication measurement, and the other method is to determine them by querying the beam pair gains that are simulated and stored in advance. The former method accumulates beam gain information through real-time training, and the data is closer to the reality, but may not be comprehensive enough. According to embodiments of the present disclosure, it is also feasible to calculate the beam gain gradient based on a part of the data, as described earlier. Therefore, this method can be used in combination with the embodiments of the present disclosure. The data obtained via the latter method is more comprehensive, but the simulation needs to meet certain accuracy requirements. In the latter method, only query and read operations are needed when calculating the beam gain gradient, which can reduce the calculation latency.

Use of Beam Gain Gradients

As described above, a beam gain gradient can indicate a spatial gain variation of a respective beam pair. The gain variation can be understood as the rate of variation or discrete degree or deviation degree of the gain of the respective beam pair at the neighboring position relative to the gain of the given position, or it can be understood as the degree of discrete or deviation of the gain of neighboring beam pairs from the gain of a given beam pair at a given position. Based on the above information reflected by the beam gain gradient, various operations can be facilitated.

According to some embodiments, the beam gradient gain can facilitate the selection of a communication beam pair. For example, a communication beam pair may be determined based on both the beam gain and the beam gain gradient. The smaller the beam gain gradient, the smaller the gain variation of the beam pair between the current position and the neighboring position, so the more stable the gain performance and the better the coverage performance (it can also be considered that its stable equivalent coverage is larger); conversely, the larger the gain gradient, the greater the gain variation of the beam pair between the current position and the neighboring position, so the more unstable the gain performance and the worse the coverage performance (it can also be considered that its stable equivalent coverage is smaller). Therefore, the beam gain gradient can be one of the considerations when selecting a beam pair for communication. When selecting a beam pair for communication, not only the size of the beam gain, but also the spatial beam gain variation reflected by the beam gain gradient can be considered, so that different beam pair selections can be made in different scenarios.

In one embodiment, a beam gain gradient may be utilized to assist in selecting an active beam pair for a mobile terminal device. For the mobile terminal device, if only the gain performance of the beam pair is considered, in the case that the beam pair with a larger gain cannot provide good coverage performance, it will cause frequent beam pairs switching when the terminal device moves, thereby increasing corresponding switching overhead. In one embodiment, the beam gain gradient is used to determine a communication beam pair between the first communication apparatus and the second communication apparatus from a plurality of beam pairs based on a relative movement state between the first communication apparatus and the second communication apparatus. For example, in some cases, other performances (e.g., gain performance) of beam pairs with different beam gain gradients may be the same or similar, or these other performances may not be the main limiting factor affecting communication quality (e.g., although the gain is small, if it can still meet the data rate requirements of the current user, then it can be considered that the gain is not the main limiting factor). At this time, a beam pair with a smaller beam gain gradient may be made to be determined to be the beam pair with higher priority for communication. In this way, the greater the relative moving speed between the first communication apparatus and the second communication apparatus, the greater the probability of performing beam pair switching, and preferably determining the beam pair with the smaller beam gain gradient as the beam pair for communication facilitates reducing the beam pair switching overhead.

It is easy to understand that the higher the beam gain is, the higher the service quality of the beam pair is; the greater the beam gain gradient is, the greater the beam switching probability of the beam pair is, that is, the easier the beam switching occurs, thereby increasing the overhead related to the beam switching. Therefore, in one embodiment, the beam pair for communication may be a downlink beam pair selected based on movement state of a mobile device and the type of communication service between a base station and a terminal device, in order to achieve a compromise between the quality of communication service and the beam switching overhead.

In one embodiment, a beam pair whose beam gain is higher than a first predetermined threshold and whose beam gain gradient is lower than a second predetermined threshold may be preferentially used for transmitting control information. Wherein, the first predetermined threshold may not be very high or the highest, but a beam gain higher than the first threshold must be able to meet a basic requirement for transmitting control signaling. Moreover, a beam gain gradient below the second predetermined threshold should ensure a certain degree of beam stability. In this way, it is possible to avoid switching beam pairs when transmitting control signaling.

In one embodiment, a beam pair whose beam gain is the highest or higher than a first predetermined threshold may be preferentially used as an active beam pair, while a beam pair whose beam gain gradient is less than a second predetermined threshold may be used as a candidate beam pair. In this way, it is possible to use the higher quality service provided by the active beam pair when it is available, or it is able to quickly enable the candidate beam pair when the active beam pair fails, so that the possibility of communication interruption due to beam switching is reduced.

In order to facilitate the description of the selection process of the beam pair for communication by the base station end, here defines a "beam quality" function, which is associated with a certain goal to be achieved. "Beam quality" of each beam pair can be calculated based on the gain of the beam pair and the beam gain gradient, and then select the beam pair that maximizes the beam quality value, that is, $$k^* = \arg\max_{k=1,\ldots,k} U(\tilde{G}_{m_k,n_k}, \nabla G_{m_k,n_k}), \quad \text{(Equation 15)}$$

Where k* indicates the beam quality value, and k indicates the sequence number of K beam pairs. In some embodiments, the beam quality function $U(\tilde{G}_{m,n}, \nabla G_{m,n})$ may be an increasing function with respect to a gain $\tilde{G}_{m,n}$ and a decreasing function with respect to a beam gain gradient $\nabla G_{m,n}$. Accordingly, the beam quality function may have the following example form, $$U(\tilde{G}_{m,n}, \nabla G_{m,n}) = \frac{\tilde{G}_{m,n}}{\nabla G_{m,n}}, \quad \text{(Equation 16)}$$

$$U(\tilde{G}_{m,n}, \nabla G_{m,n}) = \tilde{G}_{m,n}(1 - \nabla G_{m,n}), \quad \text{(Equation 17)}$$

$$U(\tilde{G}_{m,n}, \nabla G_{m,n}) = -\sqrt{\tilde{G}_{m,n}} \log(\nabla G_{m,n}), \quad \text{(Equation 18)}$$

Taking the beam pairs (T6, R3) and (T13, R4) in FIG. 7A as examples, there are $$U(\tilde{G}_{m_1,n_1}, \nabla G_{m_1,n_1}) = \frac{19.6}{0.50} = 39, \ U(\tilde{G}_{m_2,n_2}, \nabla G_{m_2,n_2}) = \frac{17.4}{0.21} = 83.$$

Therefore, it can be determined that the quality of the beam pair (T13, R4) is higher, and this beam pair can be preferentially selected for communication.

According to some embodiments, the beam gradient gain can facilitate determining a multi-antenna transmission scheme. In one embodiment, the beam gain gradient is used to determine a multi-antenna transmission scheme for communication between the first communication apparatus and the second communication apparatus. The beam gain gradient can be understood as the degree of variation (e.g., deviation degree, discrete degree) between the gain of a neighboring beam pair and the gain of a given beam pair at a given position. For space division multiplexing, it is desirable that the gain deviation of multiple beam pairs for serving communication is small. Therefore, in one embodiment, the smaller the beam gain gradient is, the higher the feasibility that a space division multiplexing transmission scheme is used for the communication between the first communication apparatus and the second communication apparatus is. In some cases, when determining a multi-antenna transmission scheme through a beam gain gradient, other performances of different beam pairs (such as gain performance) also need to be considered. For example, those other performances of a beam pair with a small beam gain gradient may be required to not be much worse than other beam pairs (for example, they may be required to be the same or similar). In other cases, the above other performance may not be the main limiting factors that affect the communication quality (for example, although the gain is small, if it can still meet the data rate requirements of the current user, then it can be considered that the gain is not the main limiting factor), then those other performances can be ignored.

According to some embodiments, the beam gradient gain can facilitate beam positioning. In beam positioning, the position of a terminal device is determined based on the directivity of a beam pair for communication. The beam pair based on is the one used in communication, so the gain should be high enough. Moreover, the larger the beam gain gradient for a beam pair is, the smaller its equivalent coverage is, and the more accurate the corresponding positioning is. Therefore, in one embodiment, the beam pair whose beam gain and beam gain gradient are both higher than thresholds may be selected as a basis for positioning direction angle.

According to an embodiment of the present disclosure, the electronic device 200 may be implemented in different ways. In one embodiment, the electronic device 200 may be implemented in combination with a first communication apparatus (for example, a base station). In another embodiment, the electronic device 200 may be implemented in combination with a second communication apparatus (for example, a terminal device). Signaling flows between a base station and a terminal device according to these embodiments will be described below with reference to FIGS. 9A to 9D.

Figure 9A:
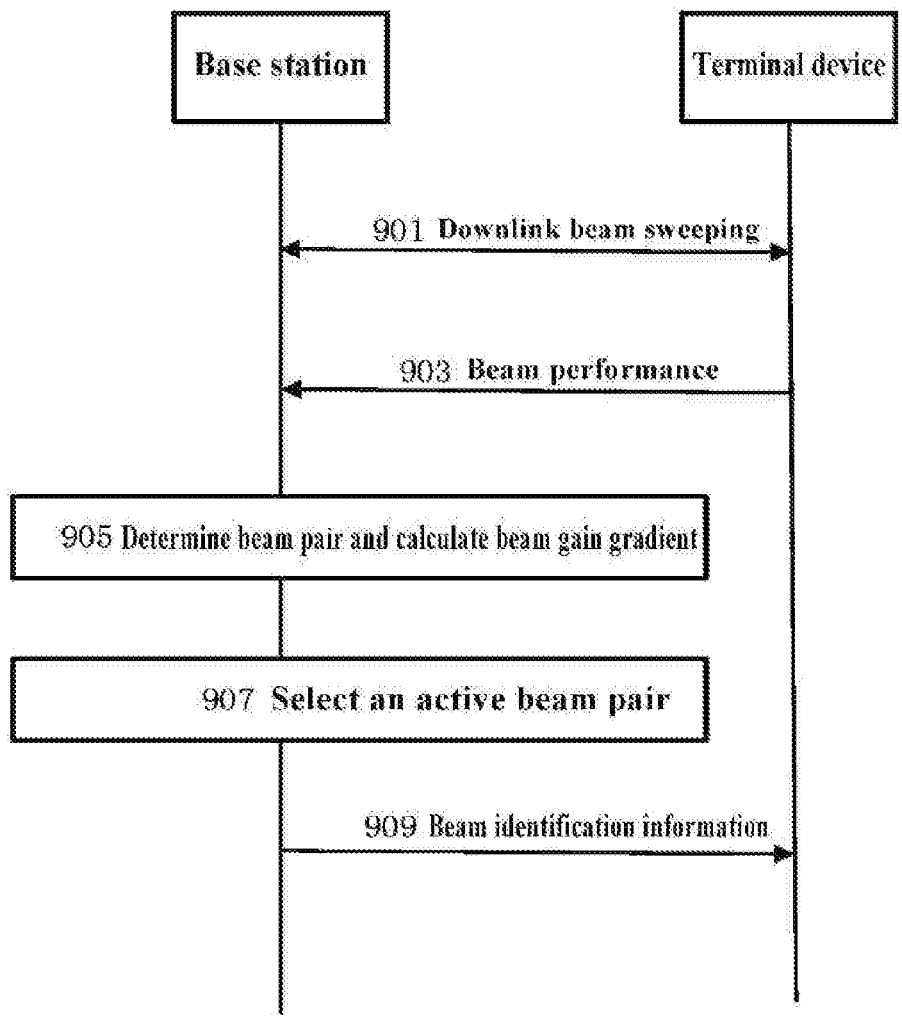
FIGS. 9A to 9D illustrate a signaling flow between a base station and a terminal device according to an embodiment of the present disclosure.

FIG. 9A illustrates a signaling flow for calculating a gain gradient for a downlink beam pair according to an embodiment of the present disclosure, in which the electronic device 200 is disposed in a base station. As shown in FIG. 9A, at 901, the base station and the terminal device may perform downlink beam sweeping based on the beam sweeping configuration information indicated by the base station, that is, use the receiving beam to receive reference signals on multiple transmitting beams from the base station for beam gain measurements of each beam pair. At 903, the terminal device may transmit (e.g., through physical layer signaling) the measured beam gain performance and corresponding beam identification information to the base station. At 905, the base station may determine K beam pairs and calculate beam gain gradients for the corresponding beam pairs. In some examples, the K beam pairs may be all or a part of the beam pairs detected between the base station and the terminal device. The K value and the value of the gradient radius R used to calculate the beam gain gradient may be specified by the communication standard or determined by the base station (for example, may be included in the beam sweeping configuration information). At 907, the base station may select an active beam pair from K beam pairs for communication with the terminal device based on the specific target of the communication and based on the performance and beam gain gradient for the beam pair. At 909, the base station may transmit (e.g., through physical layer signaling) the beam identification information of the selected active beam pair to the terminal device. The base station and the terminal device can then communicate using this downlink beam pair.

Figure 9B:
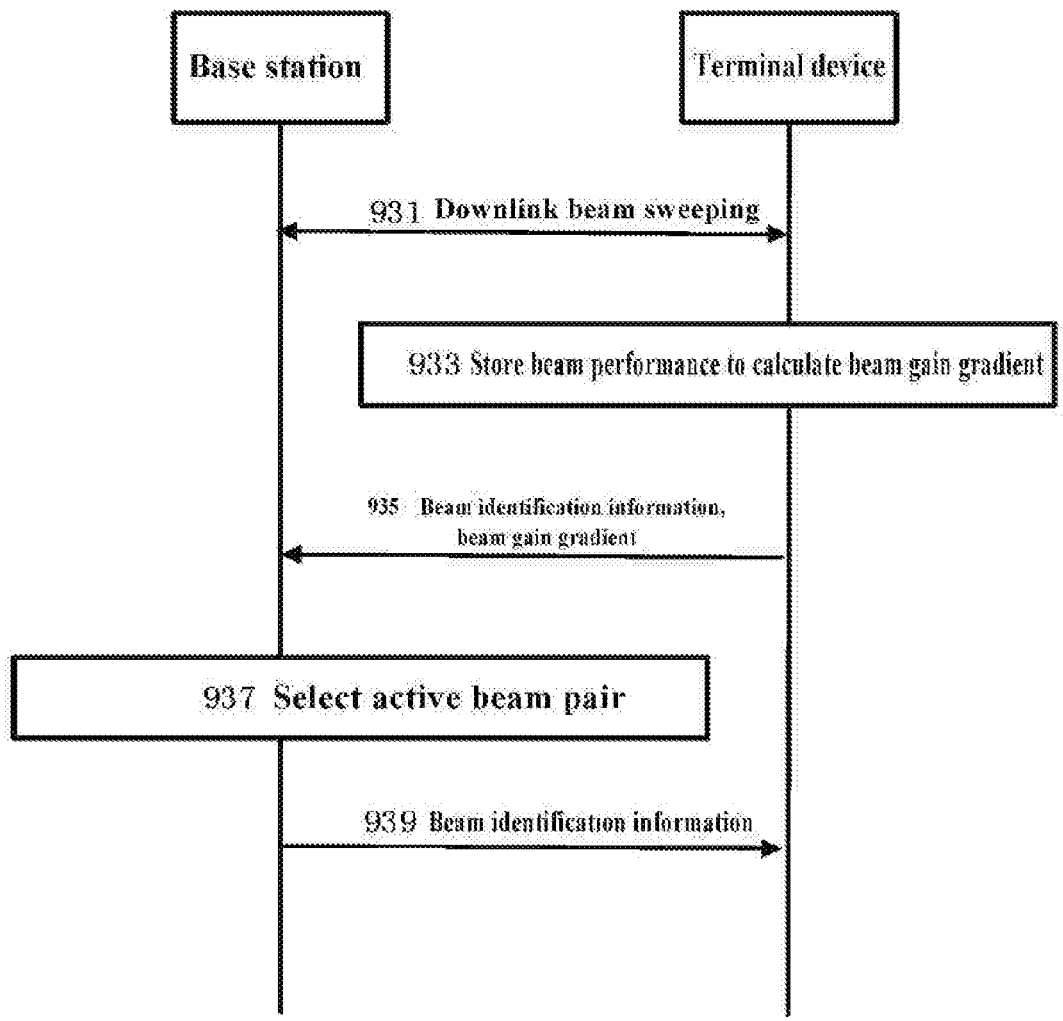

FIG. 9B illustrates a signaling flow for calculating a gain gradient for a downlink beam pair according to an embodiment of the present disclosure, in which the electronic device 200 is disposed in a terminal device. As shown in FIG. 9B, at 931, the base station and the terminal device may perform downlink beam sweeping based on the beam sweeping configuration information indicated by the base station, that is, use the receiving beam to receive reference signals on multiple transmitting beams from the base station for beam gain measurements of each beam pair. At 933, the terminal device may store the beam gain performance of each beam pair to calculate the beam gain gradient for the corresponding beam pair. The terminal device can determine K beam pairs and calculate beam gain gradients for the corresponding beam pairs. In some examples, the K beam pairs may be all or a part of the beam pairs detected between the base station and the terminal device. The K value and the value of the gradient radius R used to calculate the beam gain gradient may be specified by the communication standard or determined by the base station (for example, may be included in the beam sweeping configuration information). At 935, the terminal device may transmit (for example, through physical layer signaling) the beam identification information related to the K beam pairs and the corresponding beam gain gradient to the base station. At 937, the base station may select an active beam pair from K beam pairs for communication with the terminal device based on the specific target of the communication and based on the performance and beam gain gradient for the beam pair. At 939, the base station may transmit (e.g., through physical layer signaling) the beam identification information of the selected active beam pair to the terminal device. The base station and the terminal device can then communicate using this downlink beam pair.

Figure 9C:
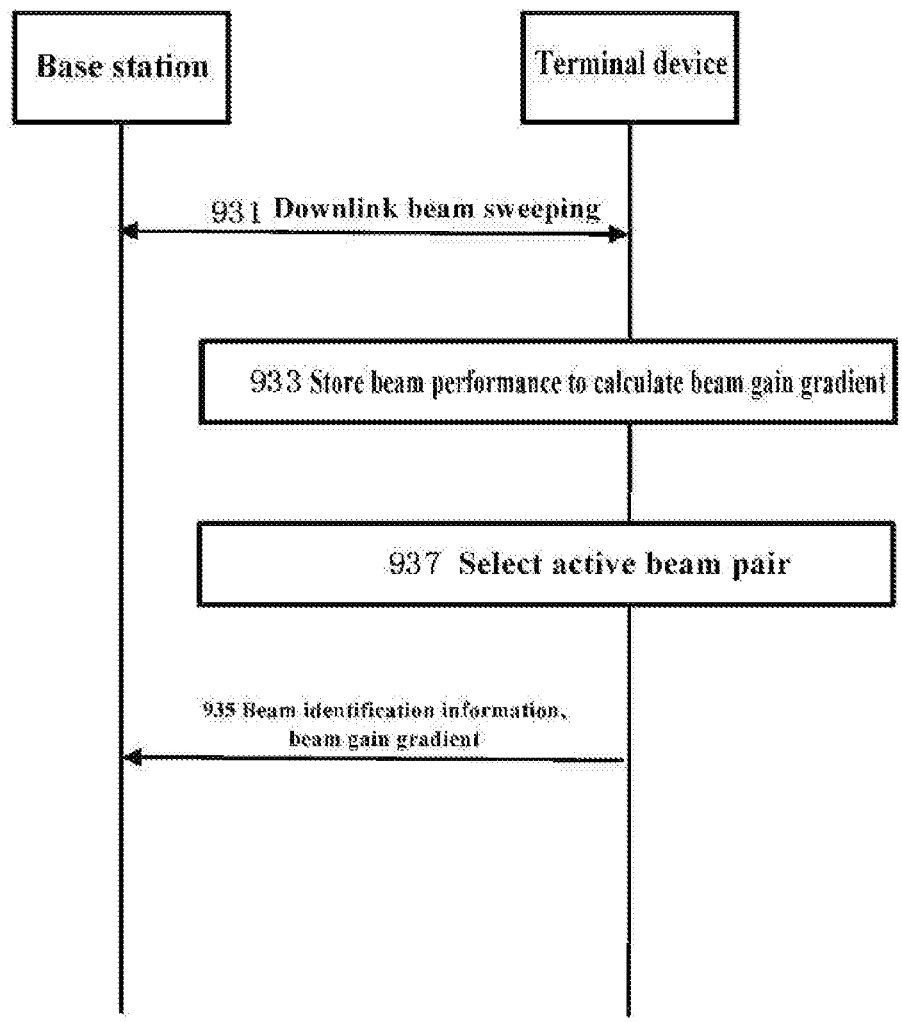

FIG. 9C illustrates a signaling flow for calculating a gain gradient for a downlink beam pair according to an embodiment of the present disclosure, in which the electronic device 200 is disposed in a terminal device. The signaling flow of FIG. 9C is similar to that of FIG. 9B, except that the terminal device selects the active beam pair at 937, and transmits the identification information of the active beam pair to the base station at 935.

Figure 9D:
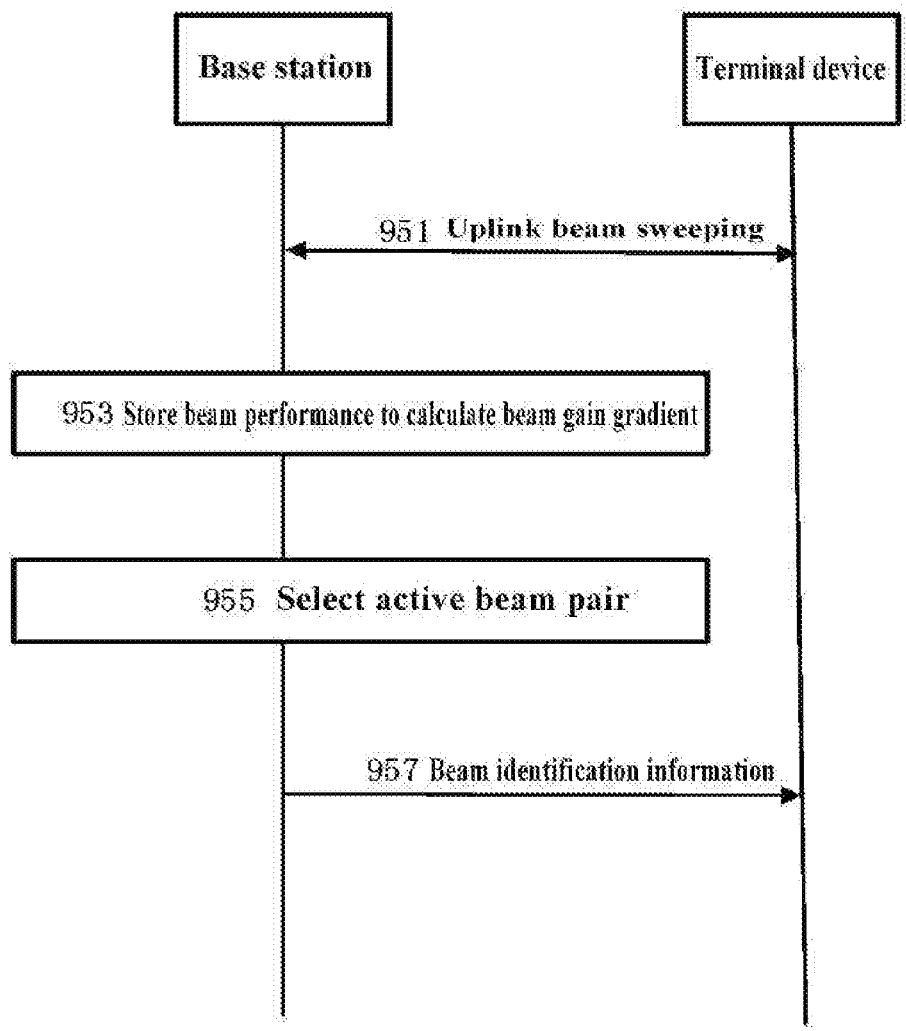

FIG. 9D illustrates a signaling flow for calculating a gain gradient for an uplink beam pair according to an embodiment of the present disclosure, in which the electronic device 200 is disposed in a base station. As shown in FIG. 9D, at 951, the base station and the terminal device may perform uplink beam sweeping based on the beam sweeping configuration information indicated by the base station, that is, use the receiving beam to receive reference signals on multiple transmitting beams from the terminal device for beam gain measurements of each beam pair. At 953, the base station may store the beam gain performance of each beam pair to calculate the beam gain gradient for the corresponding beam pair. The base station can determine the K beam pairs and calculate the beam gain gradients for the corresponding beam pairs. In some examples, the K beam pairs may be all or a part of the beam pairs detected between the base station and the terminal device. The K value and the value of the gradient radius R used to calculate the beam gain gradient may be specified by the communication standard or determined by the base station. At 955, the base station may select an active beam pair from K beam pairs for communication with the terminal device based on the specific target of the communication and based on the performance and beam gain gradient for the beam pair. At 957, the base station may transmit (e.g., through physical layer signaling) the beam identification information of the selected active beam pair to the terminal device. The base station and the terminal device can then communicate using this uplink beam pair.

Exemplary Electronic Device

Figure 10A:
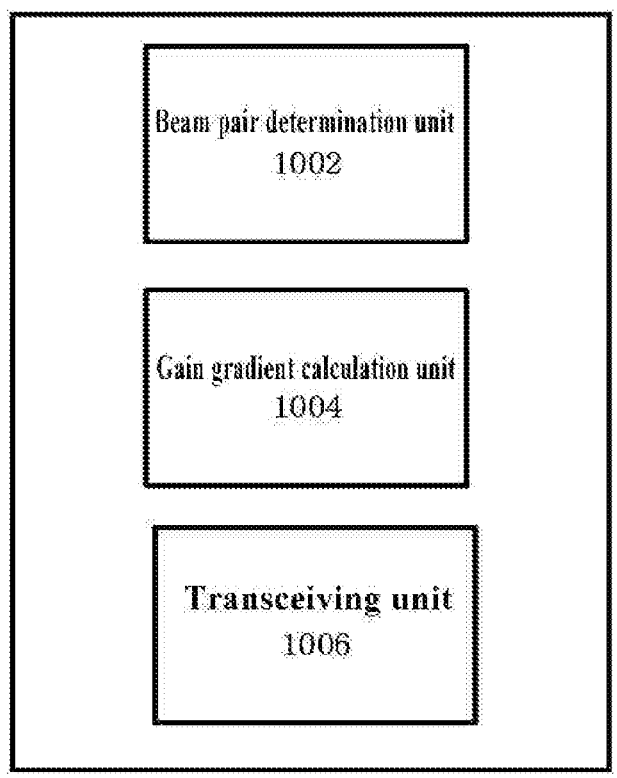
FIGS. 10A and 10B illustrate an exemplary electronic device according to an embodiment of the present disclosure.
Figure 10B:
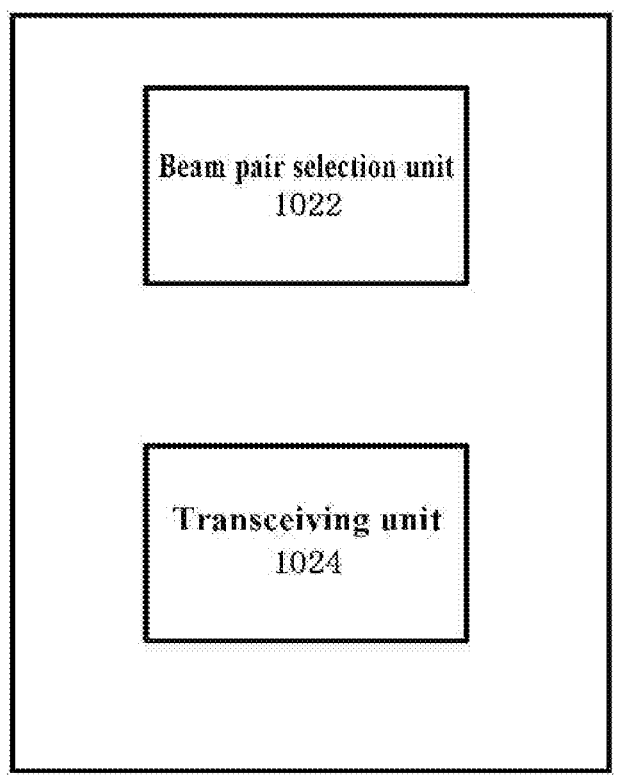

FIGS. 10A and 10B illustrate exemplary electronic devices 1000A and 1000B according to an embodiment of the present disclosure, where the electronic devices may be used in combination with various wireless communication systems. According to one implementation, the electronic device 1000A may be implemented as a terminal device, and the electronic device 1000B may be implemented as a base station.

In the example of FIG. 10A, the electronic device 1000A can comprise a beam pair determination unit 1002, a gain gradient calculation unit 1004, and a transceiving unit 1006.

In one embodiment, the beam pair determination unit 1002 can be configured to determine beam gains of K beam pairs in a downlink between a base station and a terminal device, where K is a natural number. Each beam pair can comprise a transmitting beam and a receiving beam, and have corresponding gain level.

In one embodiment, the beam gain gradient calculation unit 1004 can be configured to calculate beam gain gradient for each beam pair, where the beam gain gradient can indicate a spatial gain variation of a respective beam pair.

In one embodiment, the transceiver unit 1006 can be configured to transmit identification information related to the K beam pairs, corresponding beam gains and beam gain gradients to the base station, and receive information of the determined downlink beam pair from the base station.

In the example of FIG. 10B, the electronic device 1000B can comprise a beam pair selection unit 1022 and a transceiving unit 1024.

In one embodiment, the beam pair selection unit 1022 can be configured to determine a downlink communication beam pair from the K beam pairs based on the beam gain and the beam gain gradient.

In one embodiment, the transceiving unit 1024 can be configured to receive identification information related to the K beam pairs of the downlink, corresponding beam gains and beam gain gradients from the terminal device. The transceiver unit 1024 can further be configured to transmit the information of the determined downlink beam pair to the terminal device.

In one embodiment, the downlink beam pair can be determined based on movement state of a mobile device. Further, the higher a speed of movement of the terminal device is, the higher a priority for a beam pair with a smaller beam gain gradient to be determined as a downlink communication beam pair may be.

In one embodiment, the downlink beam pair may also be determined based on a movement state of the mobile device and a type of service of communication between the base station and the terminal device, so as to compromise between a quality of service of the communication and overhead of beam switching. Wherein, a higher quality of service goes with a beam pair with a higher beam gain, and a higher probability of beam switching goes with a beam pair with a higher beam gain gradient.

In one embodiment, a beam pair of the K beam pairs with a beam gain gradient less than a predetermined condition may be determined as a downlink beam pair for transmitting control signaling, and identification information of the downlink beam pair is transmitted to the terminal device, and the control signaling is transmitted by using the downlink beam pair.

In one embodiment, a beam pair of the K beam pairs with the highest beam gain may be determined as the active beam pair, and a beam pair of the K beam pairs with a beam gain gradient less than a predetermined condition may be determined as a candidate beam pair, and the identification information related to the active beam pair and the candidate beam pair is transmitted to the terminal device.

In the above embodiment, the beam gains of the K beam pairs may need to satisfy a predetermined condition.

According to some embodiments, the electronic devices 1000A and 1000B may be implemented at a chip level, or may also be implemented at the device level by including other external components. For example, each electronic device can work as a communication device as a whole machine.

It should be noted that the above various units are only logical modules divided according to the specific functions they implement, and are not intended to limit specific implementations, for example, they can be implemented in software, hardware, or a combination of software and hardware.

In actual implementation, the above various units may be implemented as independent physical entities, or may be implemented by a single entity (for example, a processor (CPU or DSP, etc.), an integrated circuit, or the like). Wherein, the processing circuitry may refer to various implementations of a digital circuitry, an analog circuitry, or a mixed signal (combination of analog and digital) circuitry that perform functions in a computing system. The processing circuitry can comprise, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

Aerial Communication Use Cases

Figure 11:
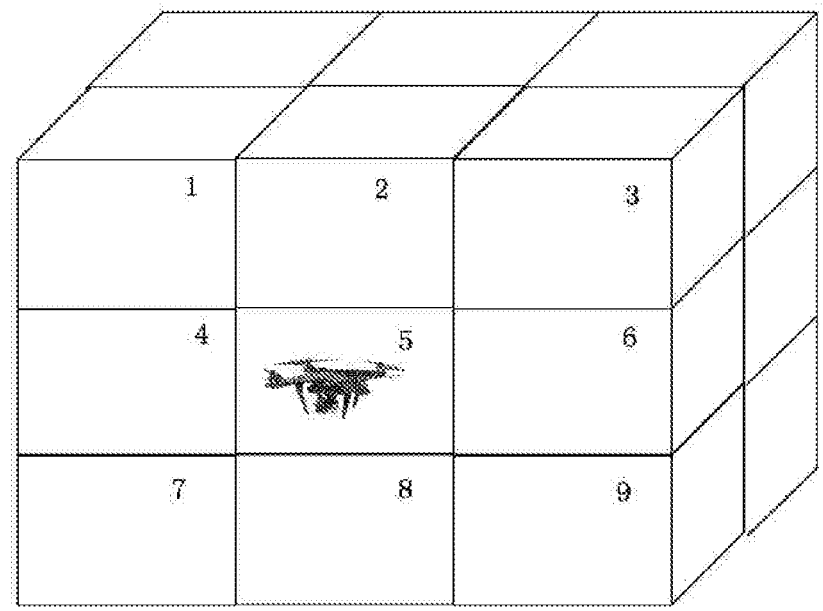
FIG. 11 illustrates a use case of a beam selection method in aerial communication according to an embodiment of the present disclosure.
Figure 11:
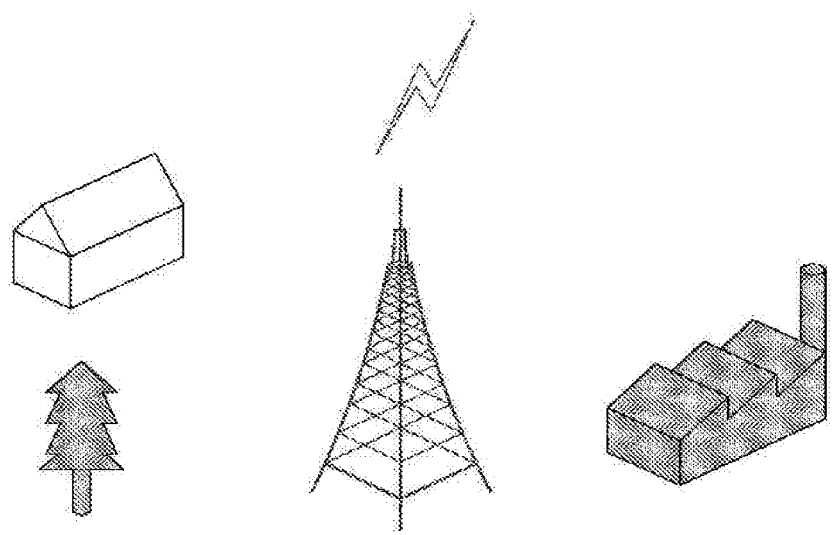

FIG. 11 illustrates a use case of a beam selection method in aerial communication according to an embodiment of the present disclosure. For example, in an aerial communication scenario between an aircraft and a base station, on the one hand, there are fewer obstacles in the air and mostly are fixed objects such as buildings, so the spatial path between a certain location in the air and the base station propagating electromagnetic waves is relatively fixed. In this scenario, the gain performance of each beam pair at each spatial position can be calculated and stored in advance by way of simulation for use in calculating the beam gain gradient. In one embodiment, the pre-obtained geographic environment mapping data can be used to model the wireless channel between each position of the aircraft in the air range that the base station can serve and the base station, and simulate the beam gain of each beam pair between each air position of the aircraft and the base station based on this model, thereby forming, for example, a table shown in FIG. 5D. After the form is obtained through simulation, such form can be saved in each base station, and the base station can notify the aircraft user of the form by broadcasting or the like. In the subsequent calculation of the beam gain gradient, the position of the current aircraft's latitude, longitude, and altitude can be obtained through apparatus like GPS or a barometer, etc., so that the n (e.g. 2) beam pairs with the best gain performance is determined by querying the above table based on the spatial position and the beam directivity, and the beam gain gradients is calculated according to the methods in Examples 1 to 4. Compared with obtaining the beam gain through instant beam sweeping, this embodiment can obtain the beam gain only by querying, and then calculate the gain gradient, which can achieve the effect of selecting a beam faster.

On the other hand, the gesture of device such as civilian aircraft when flying in the air is relatively stable. Therefore, it can be considered that the beam pointing of the aircraft at a certain spatial position is also determined. Therefore, in another embodiment, on the basis of simulation modeling and forming a table such as that shown in FIG. 5D as in the above example, beam gain gradients for these beam pairs may be further calculated and stored in advance for the n (e.g., 2) beam pairs with optimal gain performance at each spatial position according to the methods in Examples 1 to 4. The following tables can be obtained, for example. In subsequent applications, instead of performing real-time beam gain gradient calculations, the beam pair gain and gain gradient information in the table may be queried based on the spatial position, so as to select a beam for communication. For example, referring to the following table, at position 2, the beam pair (T1, R2) may be selected for communication based on the performance comparison of the beam pair (T1, R2) and (T2, R2). Compared with the above example, this embodiment can obtain the beam gain and calculate the gain gradient by only querying, which can further accelerate the beam selection. In this embodiment, the electronic device 200 may be implemented as a separate simulator to perform various operations here.

| Position | Optimal gain beam pair | Gain | Gain gradient | Suboptimal gain beam pair | Gain | Gain gradient |
|---|---|---|---|---|---|---|
| Position 1 (x2, y2) | (T2, R2) | 3.7 | 0.99 | (T1, R2) | 3.4 | 0.47 |
| Position 2 (x2, y3) | (T1, R2) | 19.6 | 0.50 | (T2, R2) | 4.9 | 0.50 |
| Position 3 | ... | ... | ... | ... | ... | |

Exemplary Methods

Figure 12A:
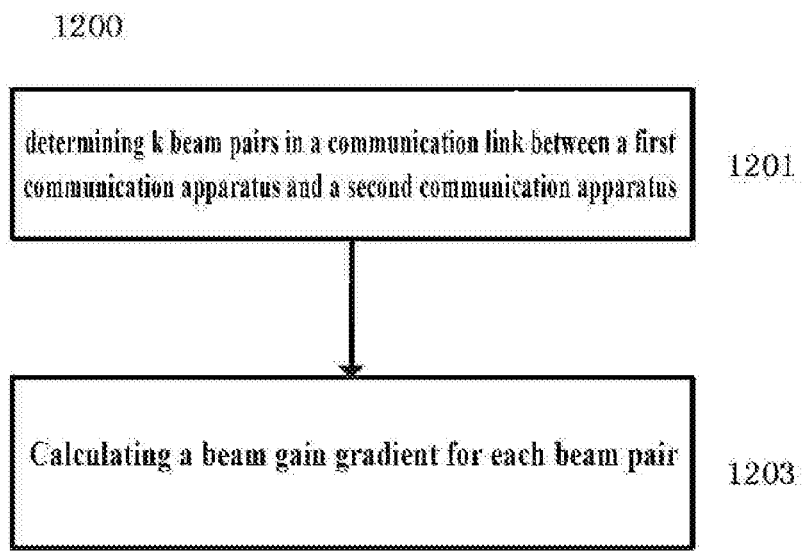

FIG. 12A illustrates an example method for communication according to an embodiment of the present disclosure. As shown in FIG. 12A, the method 1200 can comprise determining K beam pairs in a communication link between a first communication apparatus and a second communication apparatus for a wireless communication system, where K is a natural number, and each beam pair comprises a transmitting beam and a receiving beam (block 1201). The method 1200 can further comprise calculating a beam gain gradient for each beam pair, wherein the beam gain gradient indicates a spatial gain variation of a respective beam pair (block 1203). The method may be executed by the electronic device 200. For detailed example operations of the method, reference may be made to the above description of the operations and functions of the electronic device 200, which is briefly described below.

In one embodiment, the K beam pairs correspond to K beam pairs of a plurality of beam pairs between the first communication apparatus and the second communication apparatus which satisfy a predetermined condition.

In one embodiment, the beam gain gradient may be used to select a beam pair from the K beam pairs based on a relative movement state between the first communication apparatus and the second communication apparatus for communication between the first communication apparatus and the second communication apparatus.

In one embodiment, the higher a speed of the relative movement between the first communication apparatus and the second communication apparatus is, the higher a priority for a beam pair with a smaller beam gain gradient to be selected as the beam pair for communication can be.

In one embodiment, the beam gain gradient can be used to determine a multi-antenna transmission scheme for the communication between the first communication apparatus and the second communication apparatus.

In one embodiment, the smaller the beam gain gradient is, the higher the feasibility that a space division multiplexing transmission scheme is used for the communication between the first communication apparatus and the second communication apparatus can be.

In one embodiment, the method 1200 can further comprise, for each beam pair of the K beam pairs, determine variation between a gain of a particular beam pair and a gain of a beam pair neighboring the particular beam pair in terms of pointing directions, in order to calculate the beam gain gradient.

In one embodiment, the method 1200 can further comprise, for each beam pair of the K beam pairs, determine variation between a gain of a particular beam pair at a current spatial position and a gain of the particular beam pair at a neighboring spatial position, in order to calculate the beam gain gradient.

In one embodiment, the beam gain gradient for each of the K beam pairs can be calculated based on a gradient radius R, wherein the gradient radius R can indicate a spatial range based on which the beam gain gradient is calculated, and R is a natural number.

In one embodiment, the calculating of the beam gain gradient for each beam pair comprises one of:

calculating beam gain gradient for a particular beam pair based on a beam gain of a beam pair of which a receiving beam is the same as that of the particular beam pair and of which a transmitting beam is within a range of R beams in terms of pointing directions from that of the particular beam pair;

calculating a beam gain gradient for a particular beam pair based on a beam gain of a beam pair of which a transmitting beam is the same as that of the particular beam pair and of which a receiving beam is within a range of R beams in terms of pointing directions from the that of the particular beam pair;

calculating a beam gain gradient for a particular beam pair based on a beam gain of a beam pair of which a transmitting beam is within a range of R beams in terms of pointing directions from that of the particular beam pair and of which a receiving beam is within a range of R beams in terms of pointing directions from that of the particular beam pair; and calculating a beam gain gradient for a particular beam pair based on a beam gain of a beam pair at a spatial position that is within a range of R spatial positions from a current spatial position.

In one embodiment, the first communication apparatus can correspond to a terminal device, and the second communication apparatus can correspond to a base station.

In an embodiment, the method can be performed by a terminal device to calculate a beam gain gradient for a downlink beam pair, and the method further comprises: based on beam scan configuration information indicated by the base station, receive reference signals on a plurality of transmitting beams from the base station by using a plurality of receiving beams, in order to measure beam gains of respective beam pairs; and store the beam gains of the respective beam pairs, in order to calculate beam gain gradients for the K beam pairs.

In an embodiment, the method can further comprise, by the terminal device, contain beam identification information related to the K beam pairs and corresponding beam gain gradients in a physical layer signaling and feedback to the base station.

In an embodiment, the method can be performed by a base station to calculate a beam gain gradient for an uplink beam pair, and the method further comprises: based on beam scan configuration information, receive reference signals on a plurality of transmitting beams from the terminal device by using a plurality of receiving beams, in order to measure beam gains of respective beam pairs; and store the beam gains of the respective beam pairs, in order to calculate beam gain gradients for the K beam pairs.

FIG. 12B illustrates another example method for communication according to an embodiment of the present disclosure. As shown in FIG. 12B, the method 1240 can comprise determining beam gains of K beam pairs in a downlink between a base station and a terminal device, where K is a natural number (block 1241). The method 1240 can further comprise calculating a beam gain gradient for each beam pair (block 1243). The method 1240 can further comprise transmitting identification information related to the K beam pairs, corresponding beam gains, and beam gain gradients to the base station (block 1245). The method 1240 can further comprise receiving information for a selected downlink beam pair from the base station (block 1247). Wherein, each beam pair comprises a transmitting beam and a receiving beam, and the beam gain gradient indicates a spatial gain variation of a respective beam pair. The method can be executed by the electronic device 1000A. For detailed example operations of the method, reference may be made to the above description of the operations and functions of the electronic device 1000A, which will not be repeated here again.

Figure 12C:
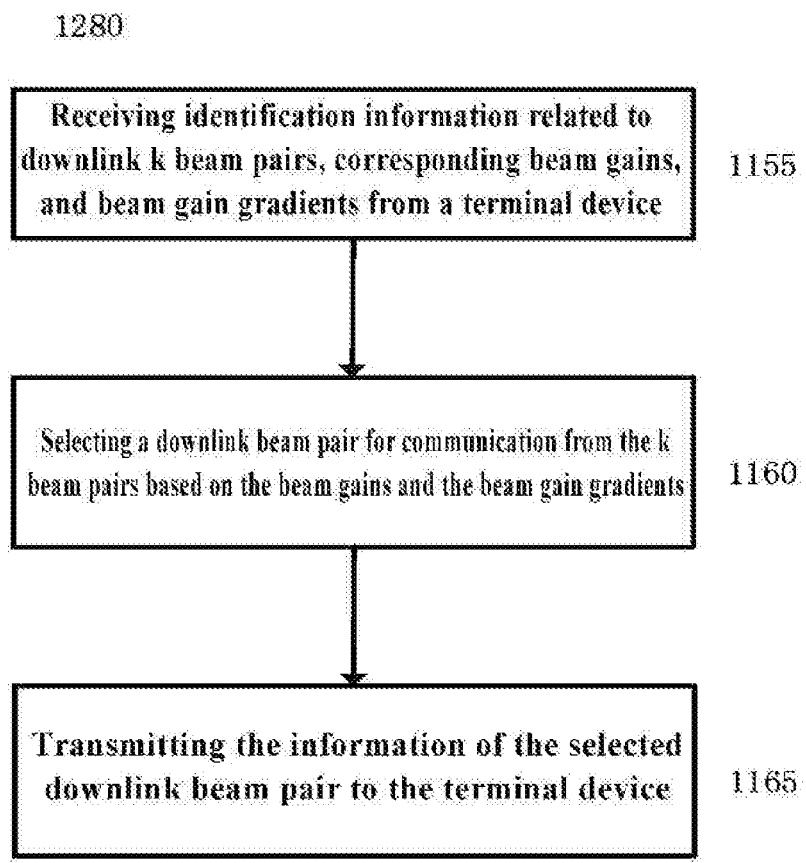

FIG. 12C illustrates yet another example method for communication according to an embodiment of the present disclosure. As shown in FIG. 12C, the method 1280 can comprise receiving identification information related to downlink K beam pairs, corresponding beam gains, and beam gain gradients from a terminal device, where K is a natural number (block 1155). The method 1280 can further comprise selecting a downlink beam pair for communication from the K beam pairs based on the beam gains and the beam gain gradients (block 1160). The method 1280 can further comprise transmitting the information of the selected downlink beam pair to the terminal device (block 1165). Wherein, each beam pair comprises a transmitting beam and a receiving beam, and the beam gain gradient indicates a spatial gain variation of a respective beam pair. The method can be executed by the electronic device 1000B. For detailed example operations of the method, reference may be made to the description of the operations and functions of the electronic device 1000B above, which will not be repeated here again.

Each of the exemplary electronic devices and methods according to embodiments of the present disclosure has been described above. It should be understood that the operations or functions of these electronic devices may be combined with each other to achieve more or less operations or functions than described. The operational steps of the methods can also be combined with each other in any suitable order, so that similarly more or fewer operations are achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can comprise, but is not limited to, a floppy disk, an optical disk, a magneto-optical disk, a memory card, a memory stick, and the like.

Figure 13:
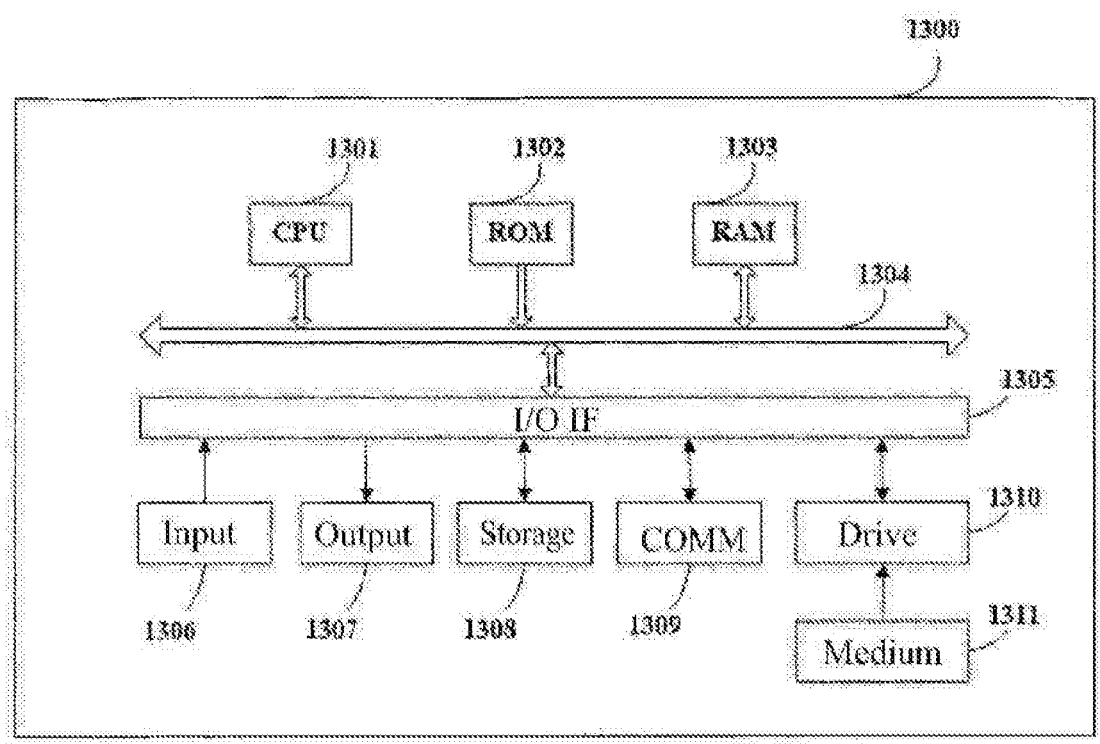
FIG. 13 is a block diagram of example structure of a personal computer which is an information processing device that can be employed in an embodiment of the present disclosure.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 13, which, when is installed with various programs, can execute various functions and so on. FIG. 13 is a block diagram showing an example structure of a personal computer which can be employed as an information processing device in the embodiment herein. In one example, the personal computer can correspond to the above-described exemplary terminal device in accordance with the present disclosure.

In FIG. 13, a central processing unit (CPU) 1301 executes various processes in accordance with a program stored in a read-only memory (ROM) 1302 or a program loaded from storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc. The communication unit 1309 performs communication processing via a network such as the Internet.

The driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 13 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (gNB), such as a macro gNB and a small gNB. The small gNB can be an gNB covering a cell smaller than the macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Use cases according to the present disclosure will be described below with reference to FIGS. 14 to 17.

Use Cases for Base Stations

It should be understood that the term base station in this disclosure has the full breadth of its ordinary meaning, and includes at least a radio communication station used as portion of a wireless communication system or radio system to facilitate communication. Examples of the base station can be, for example but not limited to, the following: the base station can be either or both of a base transceiver station (BTS) and a base station controller (BSC) in the GSM system, and can be either or both of a radio network controller (RNC) or Node B in the WCDMA system, can be eNB in the LTE and LTE-Advanced system, or can be corresponding network nodes in future communication systems (e.g., the gNB that can appear in the 5G communication systems, eLTE eNB, aircraft (e.g. drone) console etc.). Some of the functions in the base station of the present disclosure can also be implemented as an entity having a control function for communication in the scenario of a D2D, M2M, and V2V communication, or as an entity that plays a spectrum coordination role in the scenario of a cognitive radio communication.

First Use Case

Figure 14:
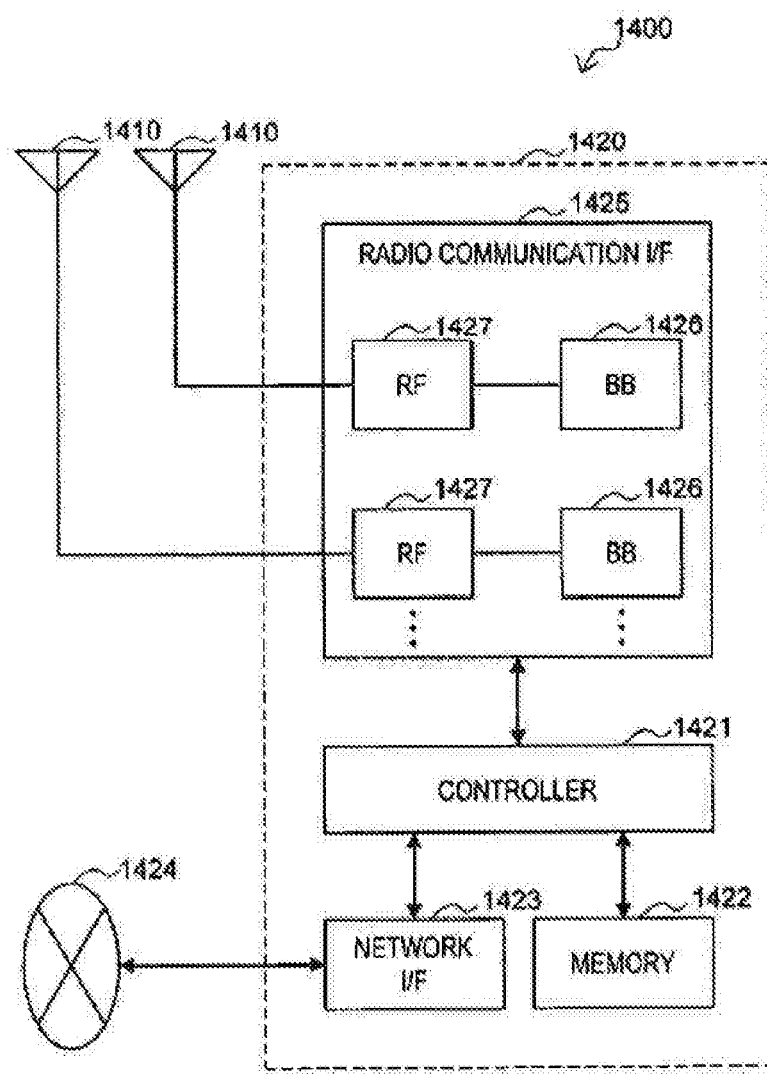
FIG. 14 is a block diagram illustrating a first example of a schematic configuration of a gNB to which the technology of the present disclosure can be applied.

FIG. 14 is a block diagram illustrating a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 14, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited to thereto; rather, one RF circuit 1427 may connect to a plurality of antennas 1410 at the same time.

As illustrated in FIG. 14, the radio communication interface 1425 may include the multiple BB processors 1426. For example, the multiple BB processors 1426 may be compatible with multiple frequency bands used by gNB 1400. As illustrated in FIG. 14, the radio communication interface 1425 may include the multiple RF circuits 1427. For example, the multiple RF circuits 1427 may be compatible with multiple antenna elements. Although FIG. 14 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 15:
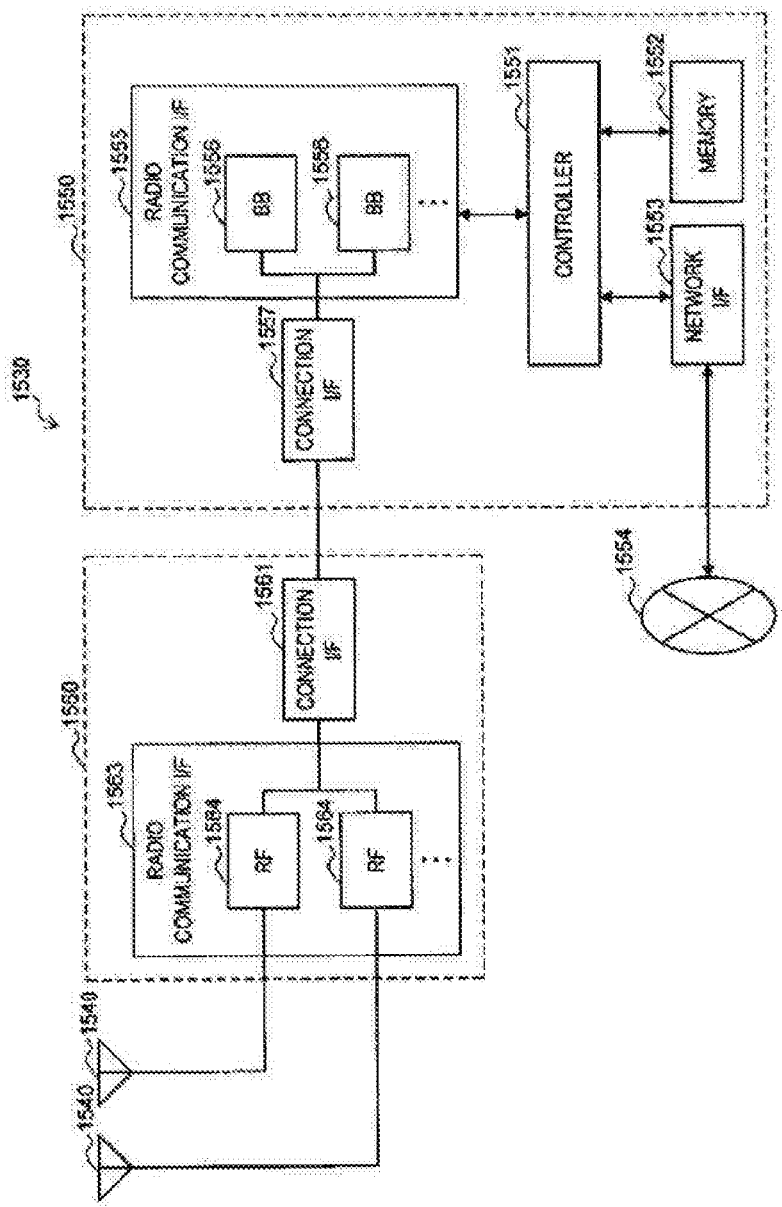
FIG. 15 is a block diagram illustrating a second example of a schematic configuration of a gNB to which the technology of the present disclosure can be applied.

FIG. 15 is a block diagram illustrating a second example of a schematic configuration of a gNB to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements such as multiple antenna elements included in a MIMO antenna and is used for the RRH 1560 to transmit and receive radio signals. The gNB 1530 may include multiple antennas 1540, as illustrated in FIG. 15. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except that the BB processor 1556 is connected to the RF circuit 1564 of the RRH 1560 via the connection interface 1557. The radio communication interface 1555 may include the multiple BB processors 1556, as illustrated in FIG. 15. For example, the multiple BB processors 1556 may be compatible with multiple frequency bands used by the gNB 1530. Although FIG. 15 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 15 illustrates the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as illustrated in FIG. 15. For example, multiple RF circuits 1564 may support multiple antenna elements. Although FIG. 15 illustrates the example in which the radio communication interface 1563 includes the multiple RF circuits 1564, the radio communication interface 1563 may also include a single RF circuit 1564.

Use Cases Related to User Devices

First Use Case

Figure 16:
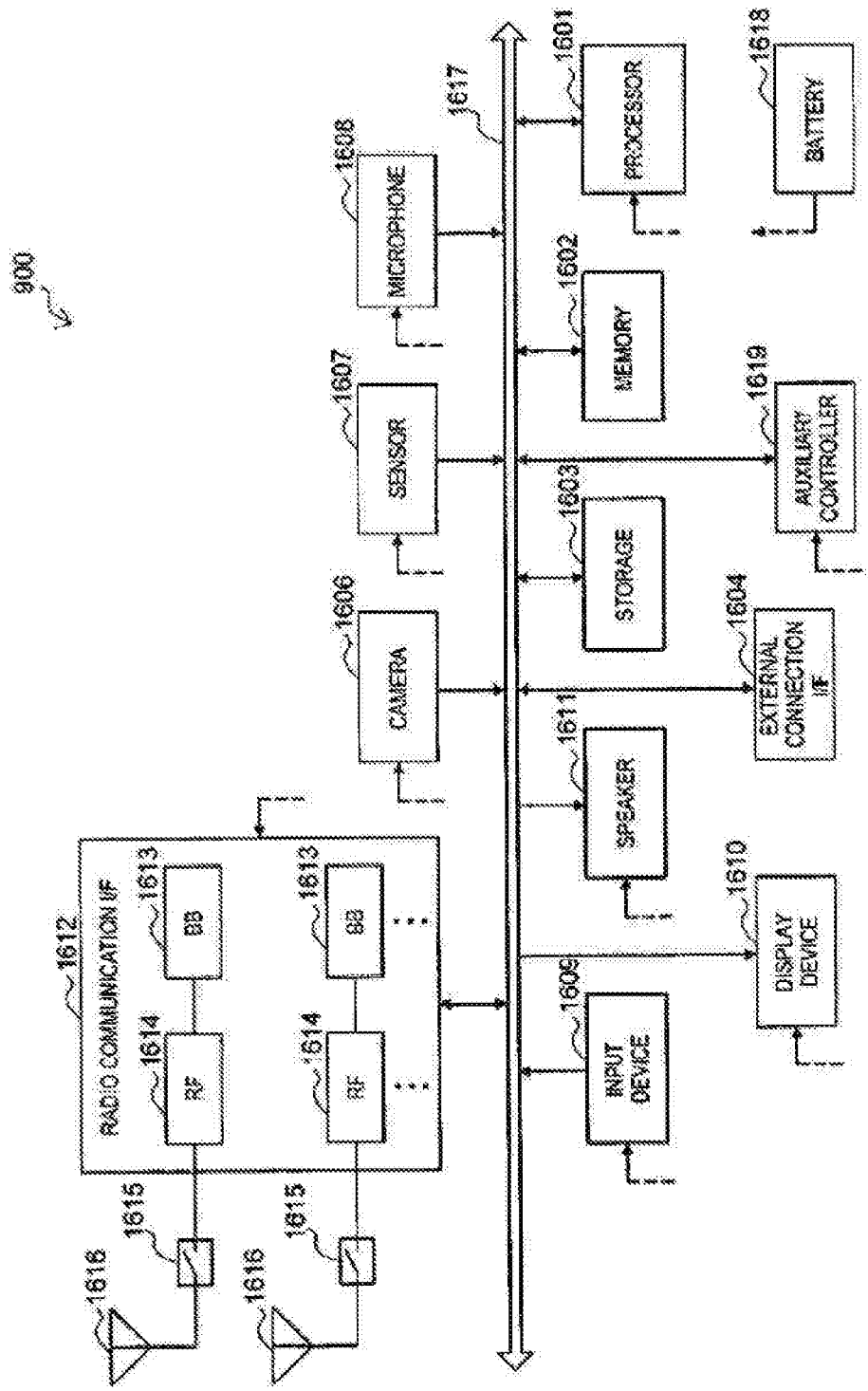
FIG. 16 is a block diagram illustrating an example of a schematic configuration of a smartphone to which the technology of the present disclosure can be applied.

FIG. 16 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to terminal device 300B and/or 1500A described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG. 16. Although FIG. 16 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG. 16. Although FIG. 16 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG. 16 via feeder lines, which are partially shown as a dashed line in the figure. The auxiliary controller 1619 operates a minimum necessary function of the smartphone 1600, for example, in a sleep mode.

Second Use Case

Figure 17:
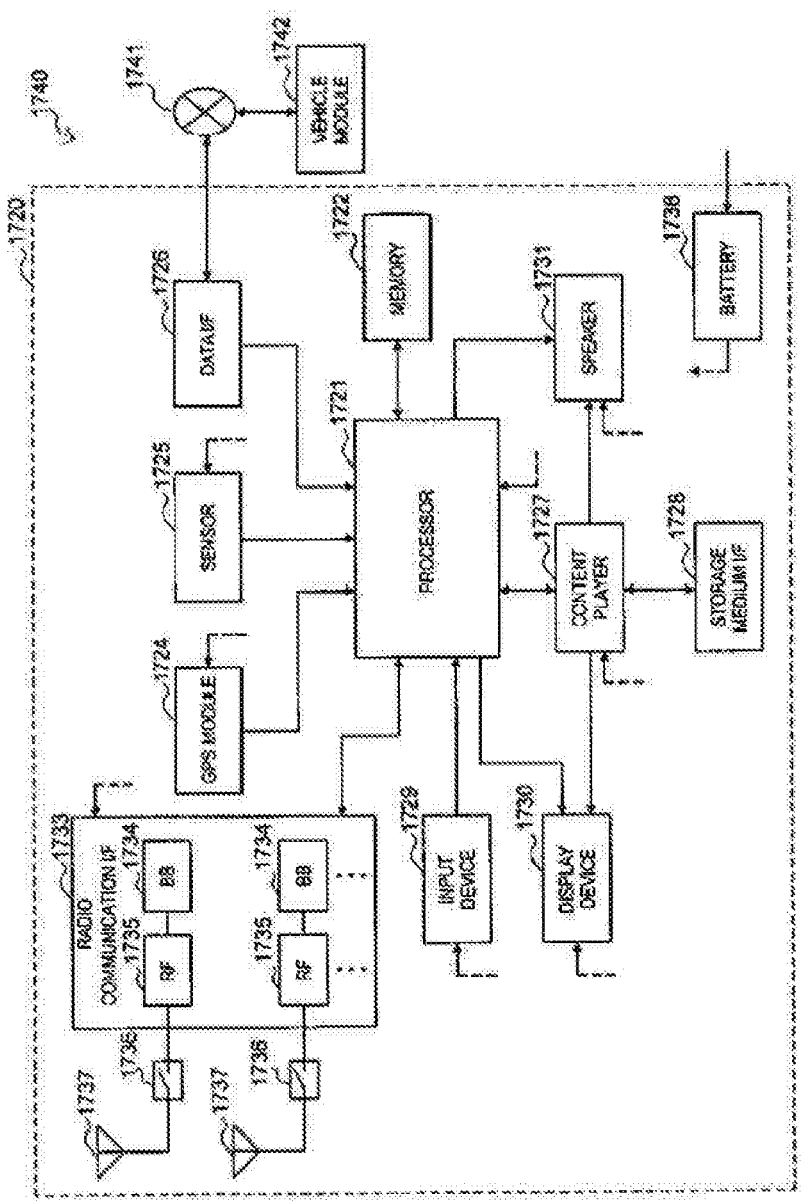
FIG. 17 is a block diagram illustrating an example of a schematic configuration of an automobile navigation device to which the technology of the present disclosure can be applied.

FIG. 17 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to terminal device 300B and/or 1500A described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the BB processor 1734 and the RF circuit 1735 thereon. The radio communication interface 1733 may include multiple BB processors 1734 and multiple RF circuits 1735, as illustrated in FIG. 17. Although FIG. 17 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG. 17. Although FIG. 17 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG. 17 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Figure 18:
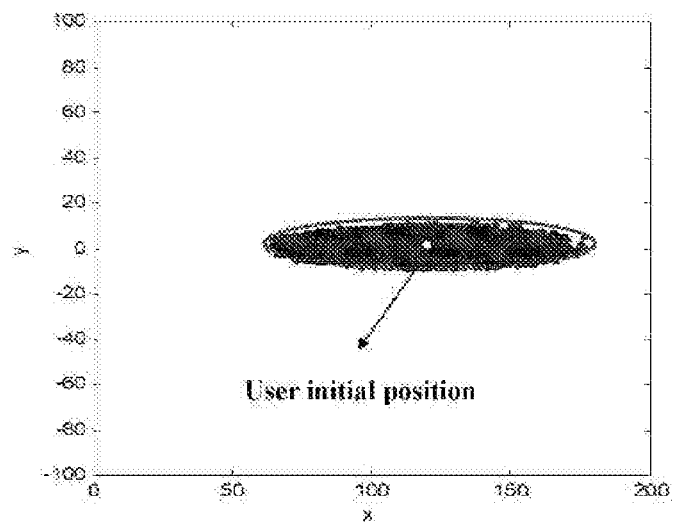
FIG. 18 illustrates a performance simulation example according to an embodiment of the present disclosure.
Figure 18:
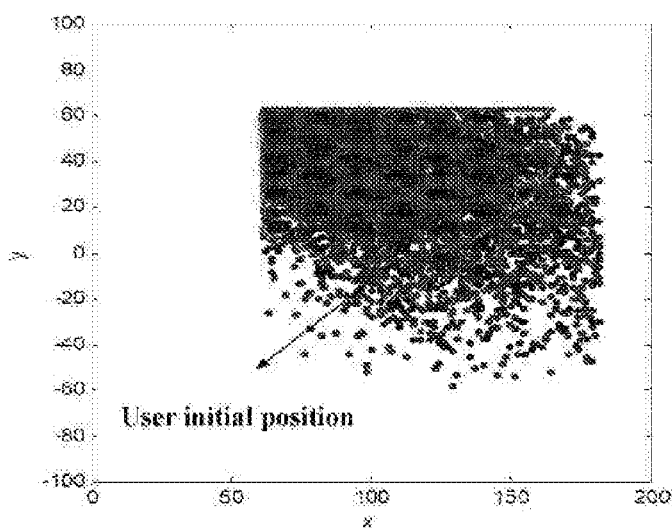

FIG. 18 illustrates a performance simulation example according to an embodiment of the present disclosure. An actual mobile communication scenario is simulated by using the beam gain gradient calculation method of the embodiment of the present disclosure. In this scenario, the base station is provided with a 16×8 uniform planar antenna array, and the terminal device is provided with a 4×4 uniform planar antenna array. The number of transmitting beams at the base station side and the number of receiving beams at the terminal device side are both equal to the number of their respective antennas. The signal transmitted by the base station can reach the terminal device directly or reach the terminal device by the reflection of buildings. The terminal device moves randomly within an area, and the initial position is the position (0, 0) in FIG. 18. The simulation employs a channel model including one LOS path and one NLOS path. The path attenuation factors of the LOS path and the NLOS path are 2.1 and 3.5, respectively. Assuming that the transmission power of the base station is constant, for the LOS path, the angular expansion of the transmission angle and the arrival angle are 3 degrees and 17 degrees respectively; for the NLOS path, the angular expansion of the transmission angle and the arrival angle are 10 degrees and 22 degrees, respectively.

As it can be seen from the simulation, the smaller the beam gain gradient generally corresponds to the larger effective coverage. FIG. 18 illustrates an example of a 3 dB coverage of a beam pair within the range of activities of a terminal device when a base station and the terminal device configure the beam according to the directions of the direct path and the reflective path. As it can be seen by comparing the upper and lower insets, that the beam pair in the direction of the reflection path has a smaller beam gain gradient (that is, 0.59<0.97) and meanwhile has a larger coverage of 3 dB. That is, the beam gain gradient can reflect the coverage of the beam pair to a certain extent. Considering the beam gain gradient when selecting a beam pair for communication can help establish a more robust communication link for mobile scenarios.

Although the illustrative embodiments herein have been described with reference to the accompanying drawings, the present disclosure is certainly not limited to the above examples. Those skilled in the art can achieve various adaptions and modifications within the scope of the appended claims, and it will be appreciated that these adaptions and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple units. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments herein are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

The invention claimed is:

1. An electronic device for a wireless communication system, comprising a processing circuitry configured to:
   determine K beam pairs in a communication link between a first communication apparatus and a second communication apparatus for a wireless communication system, where K is a natural number, and each beam pair comprises a transmitting beam and a receiving beam; and
   calculate a beam gain gradient for each beam pair, wherein the beam gain gradient indicates a spatial gain variation of a respective beam pair,
   wherein the first communication apparatus corresponds to a terminal device and the second communication apparatus corresponds to a base station; and
   wherein the electronic device is provided in the terminal device to calculate a beam gain gradient for a downlink beam pair, and the processing circuitry is further configured to:
   based on beam scan configuration information indicated by the base station, receive reference signals on a plurality of transmitting beams from the base station by using a plurality of receiving beams, in order to measure beam gains of respective beam pairs; and
   store the beam gains of the respective beam pairs, in order to calculate beam gain gradients for the K beam pairs.

2. The electronic device of claim 1, wherein the processing circuitry is further configured to contain beam identification information related to the K beam pairs and corresponding beam gain gradients in a physical layer signaling and feedback to the base station.

3. The electronic device of claim 1, wherein the electronic device is provided in the base station to calculate a beam gain gradient for an uplink beam pair, and the processing circuitry is further configured to:
   based on beam scan configuration information, receive reference signals on a plurality of transmitting beams from the terminal device by using a plurality of receiving beams, in order to measure beam gains of respective beam pairs; and
   store the beam gains of the respective beam pairs, in order to calculate beam gain gradients for the K beam pairs.

4. A terminal device for a wireless communication system, comprising a processing circuitry configured to:
   determine beam gains of K beam pairs in downlink between a base station and the terminal device, wherein K is a natural number;
   calculate a beam gain gradient for each beam pair;
   transmit identification information related to the K beam pairs, corresponding beam gains and beam gain gradients to the base station; and
   receive identification information of a selected downlink beam pair from the base station,
   wherein each beam pair comprises a transmitting beam and a receiving beam, and the beam gain gradient indicates a spatial gain variation of a respective beam pair, and
   wherein the downlink beam pair is a downlink beam pair selected based on a movement state of the terminal device, and wherein the higher a speed of movement of the terminal device is, the higher a priority for a downlink beam pair with a smaller beam gain gradient to be selected is; and/or wherein the downlink beam pair is a downlink beam pair selected based on a movement state of the terminal device and a type of service of communication between the base station and the terminal device, so as to compromise between a quality of service of the communication and overhead of beam switching, and wherein a higher quality of service goes with a beam pair with a higher beam gain, and a higher probability of beam switching goes with a beam pair with a higher beam gain gradient.

5. A terminal, comprising a processing circuitry configured to:
   determine beam gains of K beam pairs in downlink between a base station and the terminal device, wherein K is a natural number;
   calculate a beam gain gradient for each beam pair;
   transmit identification information related to the K beam pairs, corresponding beam gains and beam gain gradients to the base station; and
   receive identification information of a selected downlink beam pair from the base station,
   wherein each beam pair comprises a transmitting beam and a receiving beam, and the beam gain gradient indicates a spatial gain variation of a respective beam pair, and
   wherein a beam pair of the K beam pairs with a beam gain gradient less than a predetermined threshold is selected as a downlink beam pair for transmitting control signaling, and the processing circuitry is further configured to:
   receive identification information of the selected downlink beam pair from the base station; and
   receive the control signaling by using the selected downlink beam pair.

6. A terminal, comprising a processing circuitry configured to:
   determine beam gains of K beam pairs in downlink between a base station and the terminal device, wherein K is a natural number;
   calculate a beam gain gradient for each beam pair;
   transmit identification information related to the K beam pairs, corresponding beam gains and beam gain gradients to the base station; and
   receive identification information of a selected downlink beam pair from the base station,
   wherein each beam pair comprises a transmitting beam and a receiving beam, and the beam gain gradient indicates a spatial gain variation of a respective beam pair, and
   wherein a beam pair of the K beam pairs with the highest beam gain is selected as an active beam pair, and a beam pair of the K beam pairs with a beam gain gradient less than a predetermined threshold is selected as a candidate beam pair.

7. A base station for a wireless communication system, comprising a processing circuitry configured to:

receive identification information related to K downlink beam pairs, corresponding beam gains and beam gain gradients from a terminal device, where K is a natural number;

select a downlink beam pair for communication from the K beam pairs based on the beam gains and the beam gain gradients; and transmit the identification information of the selected downlink beam pair to the terminal device, wherein each beam pair comprises a transmitting beam and a receiving beam, and the beam gain gradient indicates a spatial gain variation of a respective beam pair, and wherein the processing circuitry is further configured to: select the downlink beam pair based on a movement state of the terminal device, and wherein the higher a speed of movement of the terminal device is, the higher a priority for a downlink beam pair with a smaller beam gain gradient to be selected is; and/or wherein the processing circuitry is further configured to select the downlink beam pair based on a movement state of the terminal device and a type of service of communication between the base station and the terminal device, so as to compromise between a quality of service of the communication and overhead of beam switching, and wherein a higher quality of service goes with a beam pair with a higher beam gain, and a higher probability of beam switching goes with a beam pair with a higher beam gain gradient.

8. A base station for a wireless communication system, comprising a processing circuitry configured to:

receive identification information related to K downlink beam pairs, corresponding beam gains and beam gain gradients from a terminal device, where K is a natural number;

select a downlink beam pair for communication from the K beam pairs based on the beam gains and the beam gain gradients; and transmit the identification information of the selected downlink beam pair to the terminal device, wherein each beam pair comprises a transmitting beam and a receiving beam, and the beam gain gradient indicates a spatial gain variation of a respective beam pair, and wherein the processing circuitry is further configured to:

select a beam pair from the K beam pairs with a beam gain gradient less than a predetermined threshold as a downlink beam pair for fling control signaling, transmit identification information of the selected downlink beam pair to the terminal device, and transmit the control signaling by using the downlink beam pair.

9. A base station for a wireless communication system, comprising a processing circuitry configured to:

receive identification information related to K downlink beam pairs corresponding beam gains and beam gain gradients from a terminal device, where K is a natural number;

select a downlink beam pair for communication from the K beam pairs based on the beam gains and the beam gain gradients; and transmit the identification information of the selected downlink beam pair to the terminal device, wherein each beam pair comprises a transmitting beam and a receiving beam, and the beam gain gradient indicates a spatial gain variation of a respective beam pair, and wherein the processing circuitry is further configured to:

select a beam pair of the K beam pairs with the highest beam gain as an active beam pair, select a beam pair of the K beam pairs with a beam gain gradient less than a predetermined condition as a candidate beam pair, and transmit identification information related to the active beam pair and the candidate beam pair to the terminal device.

* * * * *